(12) United States Patent
Baszucki et al.

(10) Patent No.: US 8,292,744 B2
(45) Date of Patent: *Oct. 23, 2012

(54) ONLINE BUILDING TOY

(75) Inventors: David B. Baszucki, Portola Valley, CA (US); Erik S. Cassel, San Mateo, CA (US)

(73) Assignee: Roblox Corporation, San Mateo, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 12/969,518

(22) Filed: Dec. 15, 2010

(65) Prior Publication Data

US 2011/0087479 A1 Apr. 14, 2011

Related U.S. Application Data

(63) Continuation of application No. 11/128,096, filed on May 11, 2005, now Pat. No. 7,874,921.

(51) Int. Cl.
 *A63F 13/00* (2006.01)
(52) U.S. Cl. ......... 463/43; 463/2; 463/5; 463/6; 463/31; 463/42
(58) Field of Classification Search .................. 463/2, 5, 463/6, 42, 43; 345/420
See application file for complete search history.

(56) References Cited

U.S. PATENT DOCUMENTS

| | | | |
|---|---|---|---|
| 6,162,108 A | 12/2000 | Frederiksen | |
| 6,195,625 B1 * | 2/2001 | Day et al. | 703/7 |
| 6,389,375 B1 | 5/2002 | Thomsen et al. | |
| 2002/0196250 A1 | 12/2002 | Anderson et al. | |
| 2003/0132966 A1 | 7/2003 | Simas et al. | |

OTHER PUBLICATIONS

The Even More Incredible Machine game manual, 1992, "http://www.replacementdocs.com/download.php?view.3716".*
ThemePark World manual, 1999, Electrnic Arts Inc. "https://www.replacementdocs.com/download.php?view.820".*
Electronic Arts, Inc., Theme Park World Manual, (http://replacementdocs.com/download.php?view.820), 1999.
Forbus, Kenneth D., "Why Computer Modeling Should Become a Popular Hobby," Guest Editorial, D-Lib Magazine, Oct. 1996, 5 pages.
Funes, Pablo, "Evolution of Complexity in Real-World Domains," Dissertation presented to the Faculty of the Graduate School of Arts and Sciences, Brandeis University, Chapters 1-4, May 2001.
Peysakhov, Maxim, et al., "Using Assembly Representations to Enable Evolutionary Design of Lego Structures," Department of Computer Science, Drexel University, 31 pages, 2003.
The Even More Incredible Machine Game Manual, (http://www.replacementdocs.com/download.php?view.3716), 1992.
Roblox Corporation Office Action for U.S. Appl. No. 11/128,096 mailed May 31, 2007.

(Continued)

*Primary Examiner* — Sunit Pandya
(74) *Attorney, Agent, or Firm* — Lowenstein Sandler PC

(57) ABSTRACT

The present invention pertains to a method and apparatus for building online games. In one embodiment, the method may include providing a user interface that facilitates user selection of parts, and placing a set of parts selected by a user in a three-dimensional (3D) world. The method may also include joining parts within the set based on their proximity to each other in the 3D world to form one or more models for a game, and sending a model file for each of these models to a server via a network for use by various users.

19 Claims, 22 Drawing Sheets

OTHER PUBLICATIONS

Roblox Corporation Office Action for U.S. Appl. No. 11/128,096 mailed Nov. 13, 2007.
Roblox Corporation Office Action for U.S. Appl. No. 11/128,096 mailed Mar. 24, 2008.
Roblox Corporation Office Action for U.S. Appl. No. 11/128,096 mailed Jun. 24, 2009.
Roblox Corporation Office Action for U.S. Appl. No. 11/128,096 mailed Dec. 4, 2009.
Roblox Corporation Office Action for U.S. Appl. No. 11/128,096 mailed May 24, 2010.
Roblox Corporation Notice of Allowance for U.S. Appl. No. 11/128,096 mailed Sep. 16, 2010.

* cited by examiner

| | None | Male Snap | Female Snap | Glue | Bolt | Weld | Ball-and-Socket | Revolute | Motor | Slider | Actuator |
|---|---|---|---|---|---|---|---|---|---|---|---|
| None | none | none | none | glue | bolt | weld | ball | rev | motor | slide | actuator |
| Male-Snap | none | none | snap | glue | bolt | weld | ball | rev | motor | slide | actuator |
| Female-Snap | none | snap | none | glue | bolt | weld | ball | rev | motor | slide | actuator |
| Glue | glue | glue | glue | glue | bolt | weld | ball | rev | motor | slide | actuator |
| Bolt | bolt | bolt | bolt | bolt | bolt | weld | ball | rev | motor | slide | actuator |
| Weld | weld | weld | weld | weld | weld | weld | ball | rev | motor | slide | actuator |
| Ball-and-Socket | ball | ball | ball | ball | ball | ball | ball | rev | motor | slide | actuator |
| Revolute | rev | rev | rev | rev | rev | rev | rev | rev | motor | rev-slider | rev-actuator |
| Motor | motor | motor | motor | motor | motor | motor | motor | motor | motor | motor-slider | motor-actuator |
| Slider | slider | slider | slider | slider | slider | slider | slider | rev-slider | motor-slider | slider | actuator |
| Actuator | actuator | actuator | actuator | actuator | actuator | actuator | actuator | rev-actuator | motor-actuator | actuator | actuator |

FIG. 11

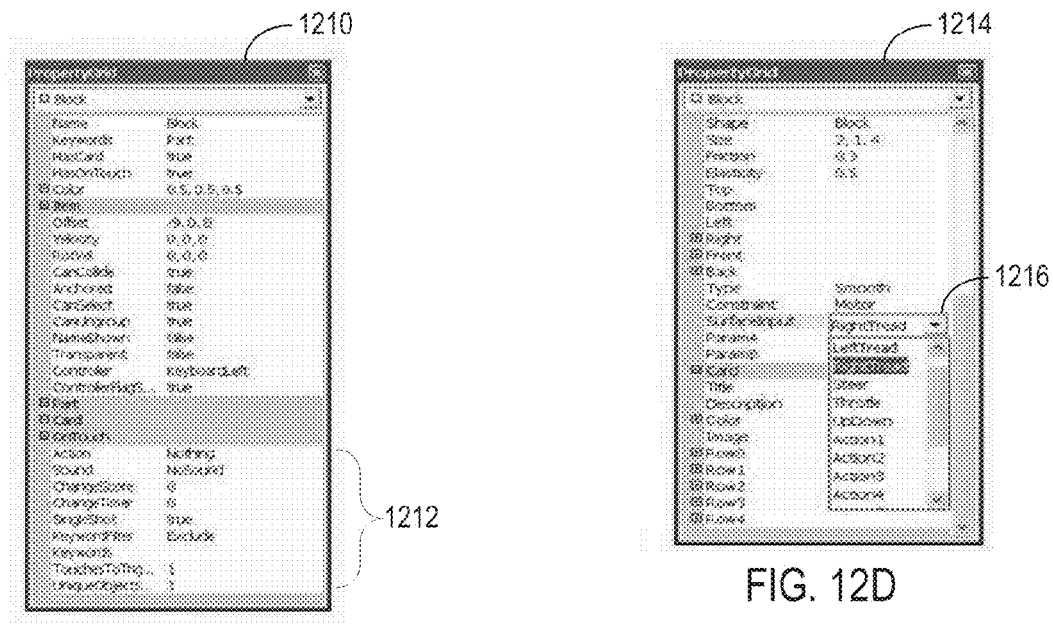
FIG. 12C
FIG. 12D
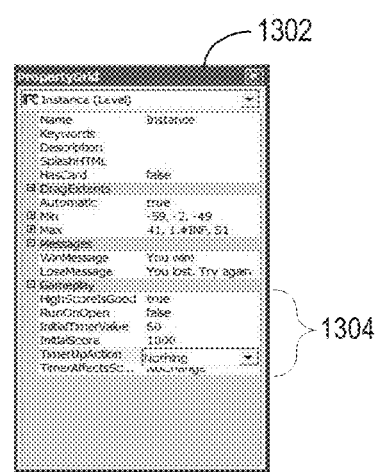
FIG. 13A

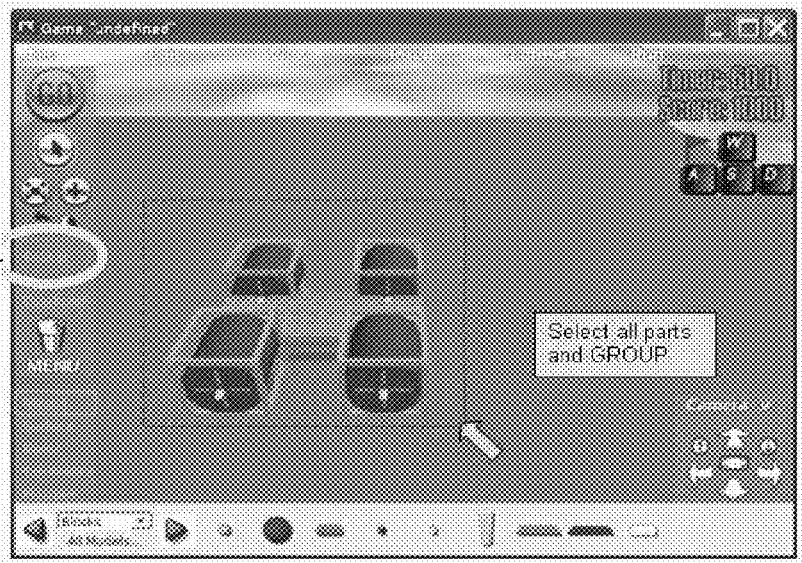
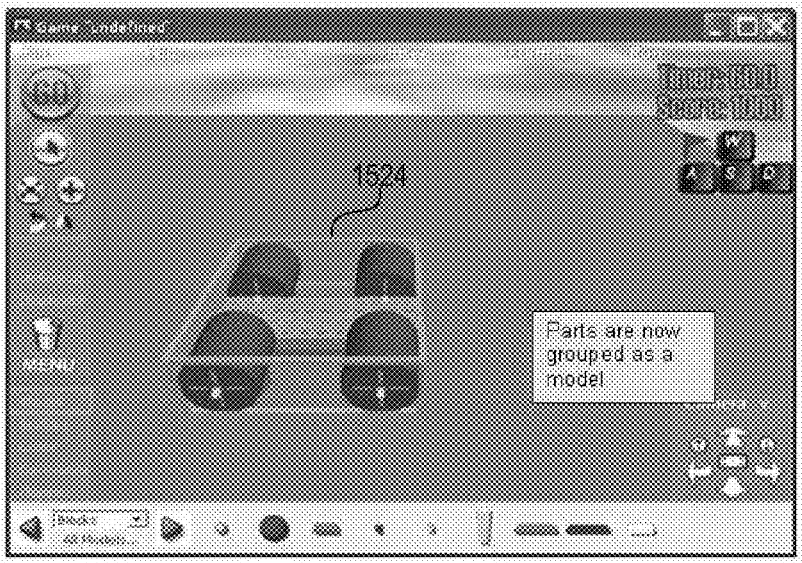
FIG. 15C

US 8,292,744 B2

ONLINE BUILDING TOY

RELATED APPLICATION

This application is a continuation of U.S. patent application Ser. No. 11/128,096, filed May 11, 2005, now U.S. Pat. No. 7,874,921, which is incorporated herein by reference.

FIELD OF THE INVENTION

This invention relates to the field of computer-aided modeling of virtual reality and, in particular, to the computer-aided building of toys in a three-dimensional virtual world.

BACKGROUND

Building and playing with models online is becoming increasingly popular among various users. Currently there are several products that allow users to build online games. For example, some products provide users with a facility for building online puzzle games. However, users of these products are restricted to building puzzle games from existing models rather than creating their own models for the game. In addition, these products do not allow users to share their games with others.

There are some products that allow users to create models in a three-dimensional (3D) world from geometric primitives. However, these products also have limitations. For example, users of these products must create models by manually joining parts together. In addition, these products do not provide convenient means for sharing models and games between multiple users.

BRIEF DESCRIPTION OF THE DRAWINGS

The present invention is illustrated by way of example, and not by way of limitation, in the figures of the accompanying drawings and in which:

FIG. 11 illustrates an exemplary joint lookup table.

DETAILED DESCRIPTION

Figure 1:
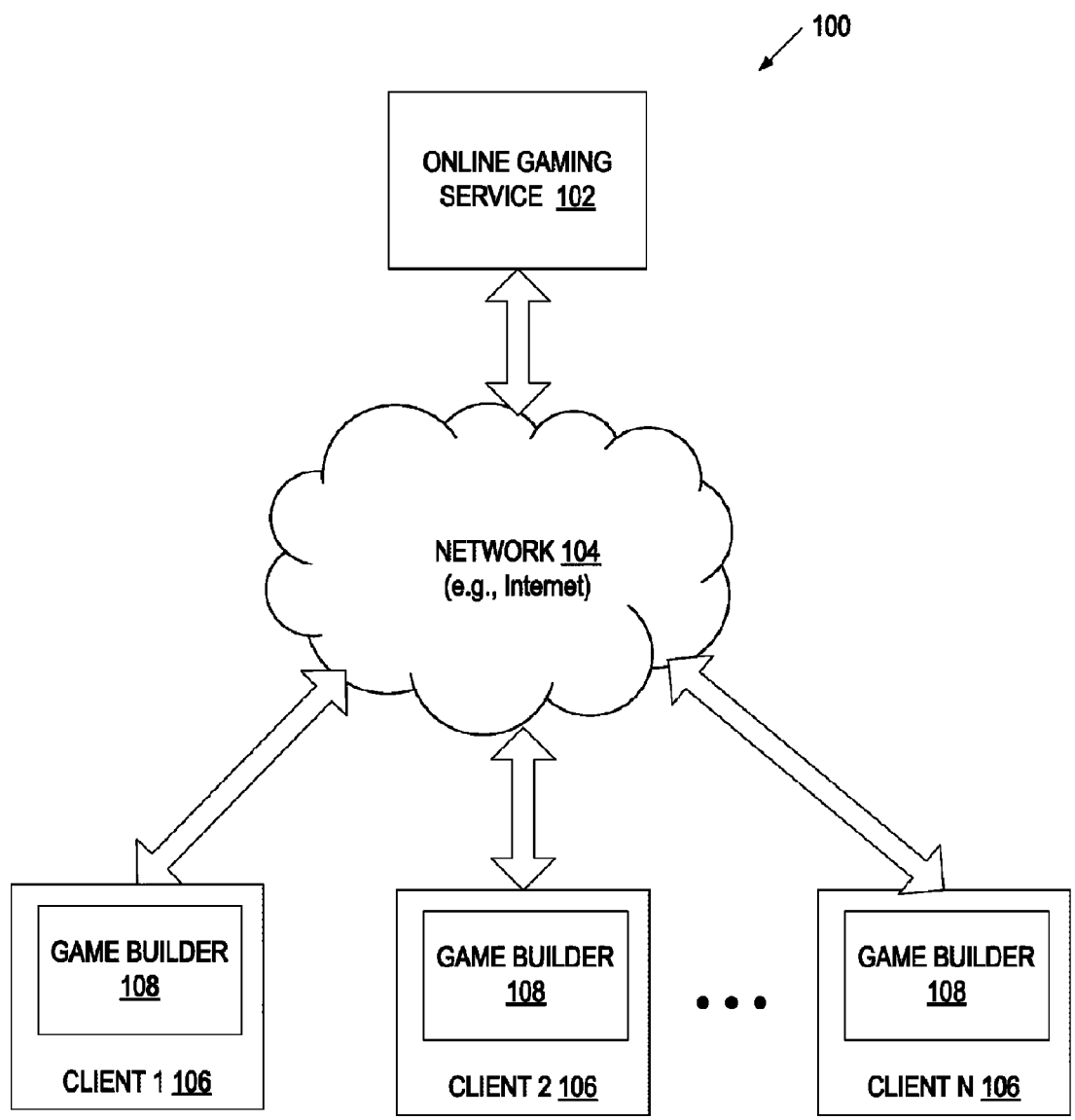
FIG. 1 illustrates one embodiment of network architecture in which embodiments of the present invention may operate.

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product, or software, that may include a machine-readable medium having stored thereon instructions, which may be used to program a computer system (or other electronic devices) to perform a process according to the present invention. A machine readable medium includes any mechanism for storing or transmitting information in a form (e.g., software, processing application) readable by a machine (e.g., a computer). The machine-readable medium may includes, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, optical, acoustical or other form of propagated signal (e.g., carrier waves, infrared signals, digital signals, etc.); or other type of medium suitable for storing electronic instructions.

The present invention may also be practiced in distributed computing environments where the machine readable medium is stored on and/or executed by more than one computer system. In addition, the information transferred between computer systems may either be pulled or pushed across the communication medium connecting the computer systems.

Some portions of the description that follow are presented in terms of algorithms and symbolic representations of operations on data bits that may be stored within a memory and operated on by a processor. These algorithmic descriptions and representations are the means used by those skilled in the art to effectively convey their work. An algorithm is generally conceived to be a self-consistent sequence of acts leading to a desired result. The acts are those requiring manipulation of quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, parameters, or the like.

A method and apparatus for building online games is described. In one embodiment, a user is provided with a user interface facilitating user selection of parts. A part may be a primitive geometrical shape such as a block, a cylinder, a sphere, etc., or some other primitive shape such as a wedge, a torus, a tube, a channel, etc. Once the user selects a part, the part is placed in a three-dimensional (3D) world. The multiple parts may be automatically joined based on their proximity to each other in the 3D world. In one embodiment, mechanical joints for physics simulation are automatically created based upon the proximity of the parts in the 3D world and the adjacent surfaces of proximate parts. A model may then be formed from multiple parts. In one embodiment, the model is formed by grouping the multiple parts (e.g., in response to a group command of the user). The resulting model may be published (saved on a server) to be available to other users. In one embodiment, prior to being published, the model is tested using physical simulation. For example, the motion of a car model may be simulated in the 3D world to illustrate how the car operates.

In one embodiment, one or more models are placed in a 3D world to create a game. Specific gameplay logic may be incorporate within the game to trigger desired game events. In one embodiment, gameplay logic is incorporated within the game by defining gameplay properties of the game and gameplay properties of this game's models. The game may be published to be available to other users.

In one embodiment, a game catalog is maintained to allow different users to select desired published games. The game catalog includes images of all published games. A user may select a desired game by clicking on its image in the game catalog. Similarly, in one embodiment, a model catalog is maintained to allow different users to select desired published models. A user may add any model from the catalog to his or her game, or modify any model from the catalog to create a new model. The model catalog includes images of all published models.

Users may receive points based on how well they play games they have created, how many people play these games, how well the players rate these games, or how many people use models created by these users.

Accordingly, users are provided with a tool that closes the loop from modeling to testing to publication to feedback for user-created physical models and games incorporating these models.

FIG. 1 illustrates one embodiment of network architecture 100 in which embodiments of the present invention may operate. The architecture 100 includes an online gaming service 102 coupled to a communications network 100 such as a public network (e.g., the Internet, a wireless network, etc.) or a private network (e.g., LAN, Intranet, etc.). The online gaming service 102 communicates with multiple client devices (clients 1 through client N) 106 via the network 104.

Each client 106 hosts a game builder module 108. The game builder 108 is responsible for allowing a user to build models and games that are physically realistic in a 3D virtual world. Models are constructed from parts that automatically join together to aid the user in editing. A part may be a primitive geometrical shape such as a block, a cylinder, a sphere, etc., or some other primitive shape such as a wedge, a torus, a tube, a channel, etc. Games are created by placing models in the 3D world. Games incorporate gameplay logic that triggers game events. The game builder 108 may publish a user's model or game by transferring the model or the game to the online gaming service 102.

The online gaming service 102 is responsible for storing models and games created by users of the clients 106. A user may be, for example, a young child (e.g., 6-10 years old), an older child, a teenager, or an adult. In one embodiment, the online gaming service 102 maintains a game catalog and a model catalog that may be presented to users in a window of a browser application running on a corresponding client 106 or a window controlled by the game builder 108. A user may select a game (created by this or other user) from the game catalog to play. The game catalog includes images of games stored on the online gaming service 102. In addition, a user may select a model (created by this or other user) from the model catalog to modify and/or add to a new game. The model catalog includes images of models stored on the online gaming service 102. In one embodiment, the online gaming service 102 conducts contests for model building, game building, or high scores in individual games.

Figure 2:
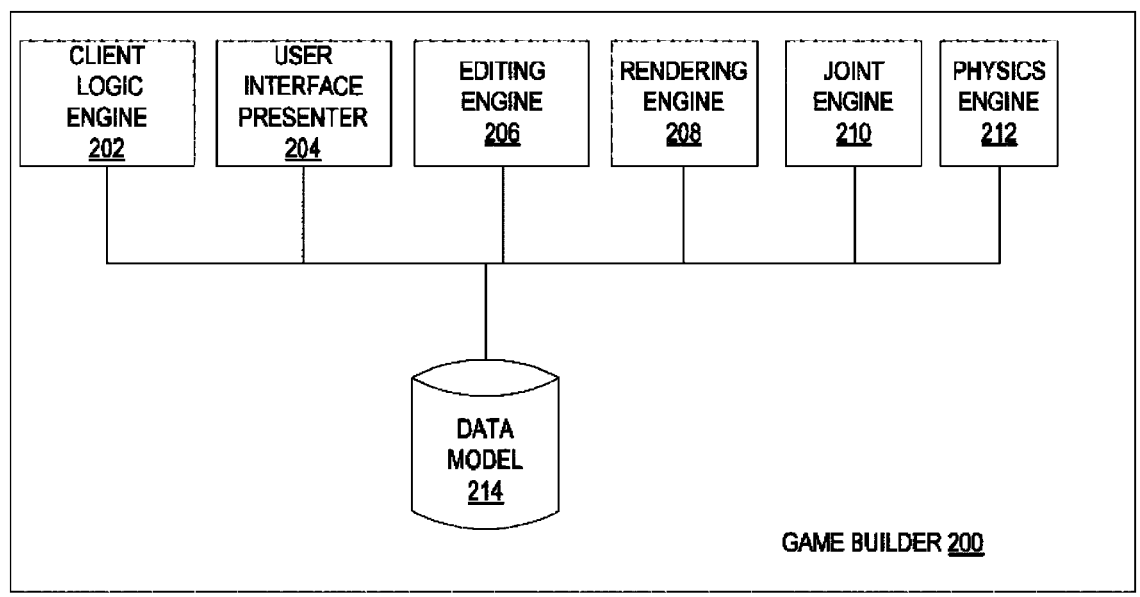
FIG. 2 is a block diagram of one embodiment of a game builder.

FIG. 2 is a block diagram of one embodiment of a game builder 200. The game builder 200 may include a game logic engine 202, a user interface presenter 204, an editing engine 206, a rendering engine 208, a joint engine 210, physics engine 212 and a data model 214.

The game logic engine 202 is responsible for invoking components of the game builder 200 based on user requests, and exchanging data with the online gaming service 102 based on user requests.

The user interface presenter 204 is responsible for generating user interfaces (UIs), presenting UIs to a user and receiving input provided by the user via the UIs. In one embodiment, UIs are presented in a window(s) of a browser application running on the client. Alternatively, UIs may be presented in a window(s) controlled by the game builder 200. The UIs provided by the user interface presenter 204 may include, for example, a home page UI, a build UI, a game catalog UI, a model catalog UI, etc. The home page UI may present to a user a list of available options (e.g., to build a new model or game, to access an existing model or game, etc.). The build UI may allow a user to select desired parts and/or models and may display the selected parts and/or models in a 3D virtual world.

The editing engine 206 is responsible for editing new and existing games and models based on user input, defining properties of new and existing models and games, and creating and updating a data model 214 for each new and existing model and game. A data model 214 is a collection of data describing a game or a model that is structured using a specific format (e.g., XML schema, binary or proprietary format).

The joint engine 210 is responsible for joining parts based on their proximity to each other in the 3D world as will be discussed in more detail below.

The rendering engine 208 is responsible for interpreting and displaying 3D images of models and games within the 3D view.

The physics engine 212 is responsible for simulating the motion of objects (models and/or parts) displayed in the 3D view. In one embodiment, the physics engine 212 simulates the object motion by computing object position and orientation on a frame by frame basis.

Figure 3:
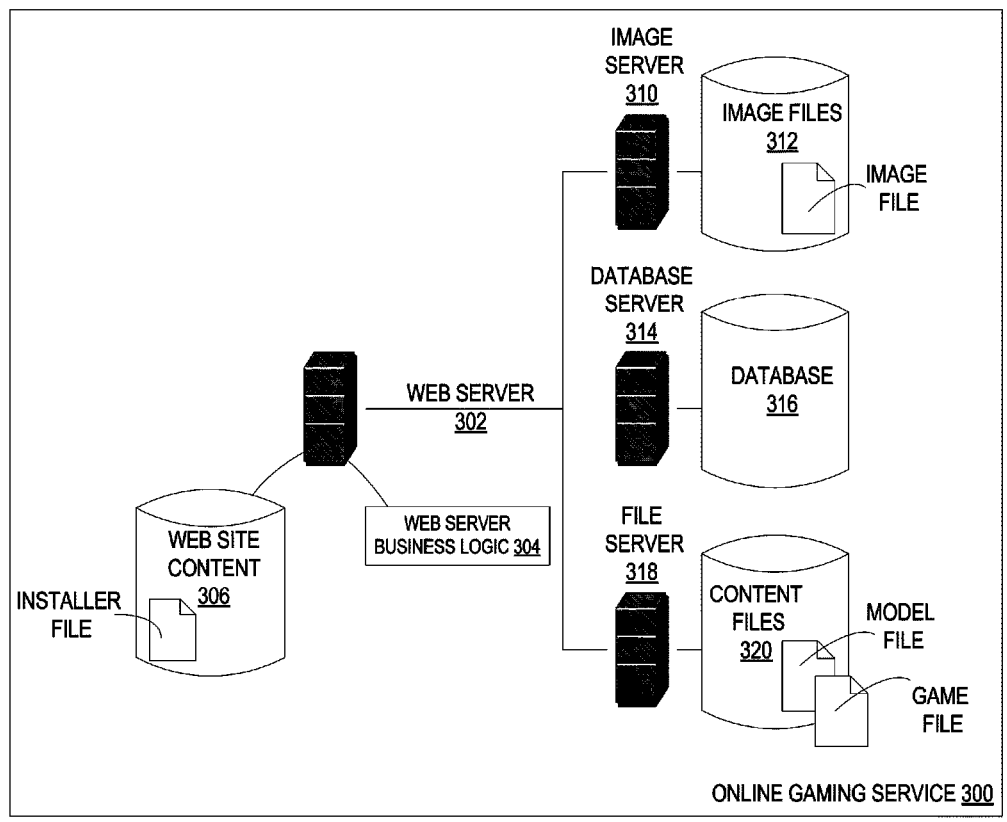
FIG. 3 illustrates one embodiment of the architecture of an online gaming service.

FIG. 3 illustrates one embodiment of the architecture of an online gaming service 300. The online gaming service 300 includes a web server 302, an image server 310, a database server 314 and a file server 318.

The file server 318 stores content files 320 received from clients 106. The content files 320 include files of models and games created by the users of clients 106. These files may be, for example, in extensible markup language (XML) format, binary format, etc. The content files 320 may also include various large media files such as textures, skyboxes, sounds, etc.

The image server 310 stores images files 312 that include images of models and games stored on the file server 318.

The database server 314 hosts a database 316 that stores, for example, profile information of each user, account information of each user, game and model information, news information, information pertaining to online forums maintained by the online gaming service 300, etc. The profile information of each user may specify, for example, games created by a user, models created by a user, public information about a user (e.g., "About Me"), recently played games, favorite games, user scores and ratings, etc. The account information may include, for example, user ID and password. The game and model information may include, for example, indexes of game and model files, indexes of corresponding game and model images, game creators, game creation dates, game popularity, user rankings of games, etc. The news information may include, for example, general information about games, information about current contests (e.g., rewards offered for users who achieve high scores for a game, etc.), etc. The forum information may include, for example, discussions about games and models, technical support forum information, etc.

The web server 302 hosts web site content 306 and web server logic 304. The web server logic 304 receives content requests from clients 106 and sends pages (e.g., HTML pages) with the requested content to the clients 106. In one embodiment, the web server logic 304 is responsible for composing model and game catalogs with images of models and games from the image server 310, and sending pages containing these catalogs to the clients 106. The web site content 306 may include, for example, model and game catalogs, cached model and game files, an installer file for the game builder 108, etc.

Figure 4:
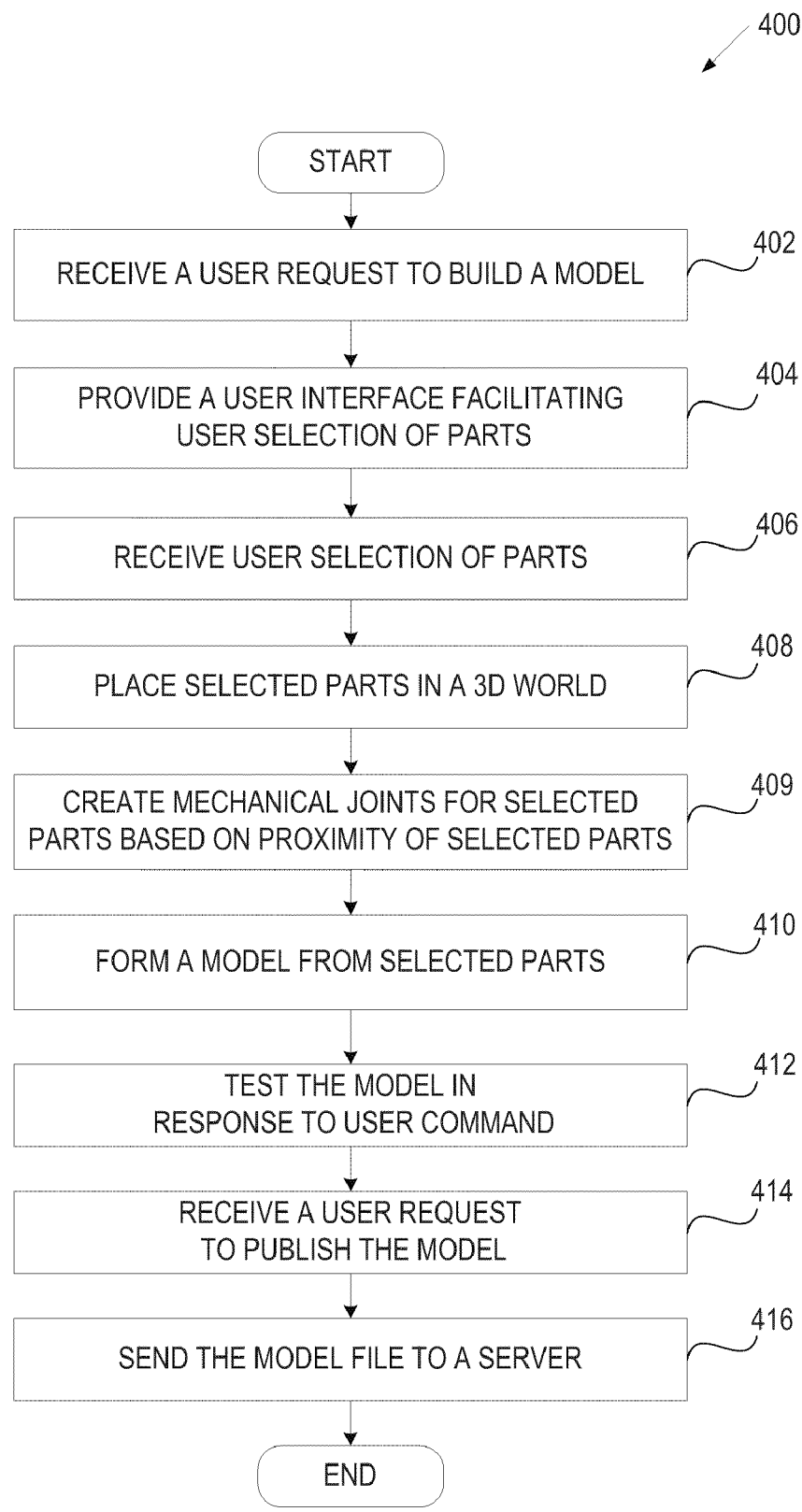
FIG. 4 is a flow diagram of one embodiment of a process for creating a model.

FIG. 4 is a flow diagram of one embodiment of a process 400 for creating a model. The process may be performed by processing logic that may comprise hardware (e.g., dedicated logic, programmable logic, microcode, etc.), software (such as run on a general purpose computer system or a dedicated machine), or a combination of both. In one embodiment, processing logic resides in a game builder 108 of FIG. 1.

Referring to FIG. 4, process 400 begins with processing logic receiving a user request to build a model (processing block 402). In one embodiment, the user request to build a model is received upon a user selection of a build model option in a home page UI.

At processing block 404, processing logic provides a user interface facilitating user selection of parts. A part may be a primitive geometrical shape such as a block, a cylinder, a sphere, etc., or some other primitive shape such as a wedge, a torus, a tube, a channel, etc. Each part may be characterized as an item having a set of properties. The properties of the part may include, for example, physical properties, visual properties, descriptive properties, physical simulation properties, gameplay properties, etc. Physical properties may specify, for example, size, mass, elasticity, frictional characteristics, velocity, anchoring, etc. Visual properties may specify, for example, transparency, displayed name, color, surface textures, etc. Descriptive properties may specify, for example, the part's name, keywords describing the part, etc. Physical simulation properties may specify, for example, whether the part will collide with other items during physical simulation, whether the part will act as a fixed object during physical simulation, etc. Gameplay properties may include, for example, on-touch triggers indicating actions to be taken when the part makes contact with another item during physical simulation, on-break triggers indicating which events should take place when the part collides with another item during physical simulation, etc.

At processing block 406, processing logic receives user selection of parts. At processing block 408, processing logic places the selected parts in a 3D virtual world. In one embodiment, the 3D virtual world is a 3D view of a game. Initially, this may be a 3D view of an empty game. In one embodiment, the user is allowed to move parts within the 3D world. In one embodiment, upon a user request, the user may be presented with a dialog box displaying a subset (or all) of item properties for the selected part. The dialog box may display default values of the properties and allow the user to modify the default properties as needed. The dialog box may appear, for example, by selecting a property option in the menu of the build UI or by double-clicking the part in the 3D view.

At processing block 409, processing logic automatically creates mechanical joints for the selected parts based on their proximity to each other in the 3D world. In one embodiment, each resulting joint has one or more properties, including, for example, a joint type property, a joint flexibility property, a break threshold property, etc. One embodiment of a process for joining adjacent parts will be discussed in more detail below in conjunction with FIG. 5.

At processing block 409, processing logic forms a model from the selected parts. In one embodiment, the model is formed when the user selects parts in the 3D world and uses a group option in the menu of the build UI to request that the selected parts be turned into a model.

In one embodiment, a model is characterized as an item having a set of properties. In particular, a model may define a new item, along with a list of items representing parts within this model. The properties of the model may include, for example, physical properties, visual properties, descriptive properties, editing properties, physical simulation properties, gameplay properties, etc. Physical properties may specify, for example, velocity, anchoring, etc. Visual properties may specify, for example, transparency, displayed name, etc. Descriptive properties may specify, for example, name, keywords describing the model, etc. Editing properties may specify, for example, whether the model can be selected for editing, whether the model can be ungrouped (separated into individual parts), etc. Physical simulation properties may specify, for example, whether the model will collide with other items during physical simulation, whether the model will act as a fixed object during physical simulation, etc. Gameplay properties may include, for example, on-touch triggers indicating actions to be taken when the model makes contact with another item during physical simulation, on-break triggers indicating which events should take place when the model collides with another item during physical simulation, etc.

In one embodiment, upon a user request, the user may be presented with a dialog box displaying a subset (or all) of item properties for the model. The dialog box may display default values of the properties and allow the user to modify the default properties for the model as needed. The dialog box may appear, for example, by selecting a property option in the menu of the build UI or by double-clicking the model in the 3D view.

In one embodiment, processing logic associates the model with a controller that indicates how the model receives control signals during the physical simulation. Controllers may vary depending on the device from which they gather input. These devices may include, for example, a keyboard, a mouse, a joypad, artificial machine intelligence, etc. A controller may generate various control signals such as a left tread signal, a right tread signal, a forward/back signal, and a left/right signal. In one embodiment, a controller is displayed with the model as a flag or symbol. The flag or symbol may have a specific color or shape to illustrate the selected controller. An artificial machine intelligence controller may generate chase or flee behavior based on the proximity of other controlled items.

In one embodiment, processing logic creates a data model (e.g., using XML scheme) for the new model using properties of the model, properties of parts integrated into the model, and properties of joints within the model.

At processing block 412, processing logic simulates the motion of the model to test how the model behaves. In one embodiment, processing logic begins the simulation in response to a user command (e.g., a user selection of a run option in the menu of the build UI). Alternatively, processing logic begins simulation automatically when the user creates the model. One embodiment of a process for testing a model will be discussed in more detail below in conjunction with FIG. 6. Based on the result of the simulation, the model may be modified.

At processing block 414, processing logic receives a user request to publish the model. In one embodiment, the user request is received when the user selects a publish option in the menu of the build UI.

At processing block 414, processing logic sends the model file to a server (e.g., online gaming service 102 of FIG. 1). In one embodiment, processing logic creates the model file by converting the data model into a binary stream.

Figure 5:
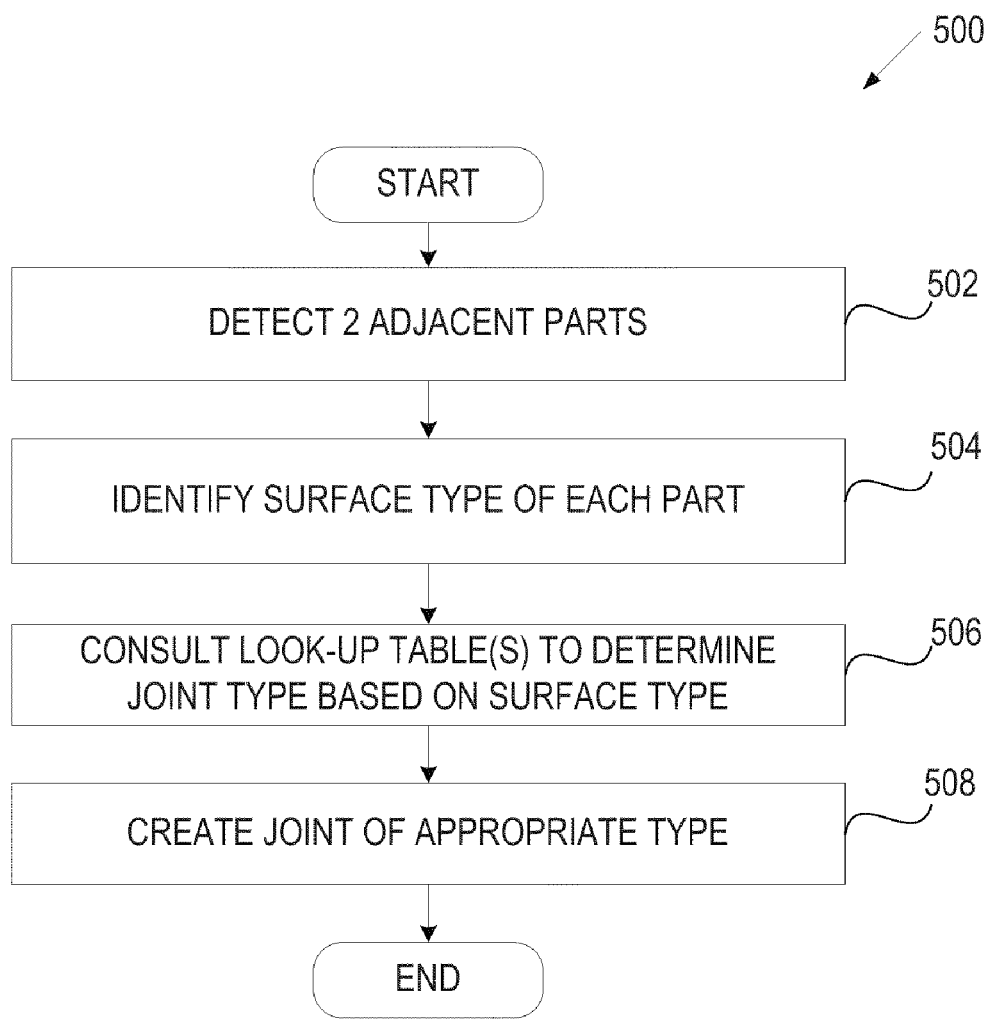
FIG. 5 is a flow diagram of one embodiment of a process for joining parts.

FIG. 5 is a flow diagram of one embodiment of a process 500 for joining parts. The process may be performed by processing logic that may comprise hardware (e.g., dedicated logic, programmable logic, microcode, etc.), software (such as run on a general purpose computer system or a dedicated machine), or a combination of both. In one embodiment, processing logic resides in a joint engine 210 of FIG. 2.

Referring to FIG. 5, process 500 begins with processing logic detecting two adjacent parts (processing block 502). In one embodiment, the adjacency of the two parts is determined by aligning the parts to a grid in the 3D view. In another embodiment, the adjacency of the two parts is determined by aligning one part to a grid defined by the surface of another part in the 3D view. In one embodiment, when the surfaces of the two parts occupy the same plane and overlap, the parts are considered to be adjacent. A part's surface may correspond to the part's face, or the face of the rectangular bounding box that encloses the part. For example, a block part has six surfaces that correspond to its faces. Surfaces can define a coordinate system from any corner or the center of the surface.

At processing block 504, processing logic determines the surface type of each part. Exemplary surface types include no surface, male snap, female snap, glue, bolt, weld, ball and socket, revolute, motor, slider, and actuator. Surfaces may have a texture property specifying a texture for surface appearance. Surfaces may also have properties that dictate physical effects such as wind, fire, electricity, etc.

At processing block 506, processing logic uses the surface type to find the joint type to be used for connecting the two parts. The joint type indicates how the two adjacent parts will be joined. The join type may be found by searching one or more lookup tables. In one embodiment, processing logic searches a single joint lookup table. FIG. 11 illustrates an exemplary joint lookup table that specifies joint types for various combinations of surface types. Possible joints include a no-joint type (no contact of objects during physical simulation), snap joint (rigid joint, breakable, similar to a snap fit), glue (rigid joint, slightly flexible, breakable), bolt (rigid joint, not flexible, high breakage threshold), weld (rigid joint, not flexible, not breakable), ball and socket (3 degree of rotational freedom joint, no translational freedom), revolute (1 degree or rotational freedom, no translational freedom), motor (revolute with rotation, rotational velocity, rotational acceleration, or torque driver), slider (1 degree of translational freedom perpendicular to part surface), actuator (slider with position, velocity, acceleration or force driver), revolute-slider (1 degree of rotational freedom, 1 degree of translational freedom), revolution-actuator (actuator with 1 degree of rotational freedom), motor-slider (motor with 1 degree of translational freedom), and motor-actuator (actuator and motor combined).

In another embodiment, processing logic first uses a rigid joint lookup table to determine whether a rigid joint should be constructed between the two parts, and if so, the type of the rigid joint. Rigid joint types may include, for example, a glue joint, a weld joint, a bolt joint, and a snap-fit joint.

If the rigid joint lookup table does not indicate a rigid joint for the parts, processing logic searches a mechanical joint lookup table to determine whether a mechanical joint should be constructed between the two parts, and if so, the type of the mechanical joint. Mechanical joint types may include, for example, a revolute joint, a revolute with motor joint, a translational joint, a translational with motor joint, and ball-socket type joints. Motor joints are joints that are driven, and can have the additional property of a driving force, position, velocity or acceleration in the degree of freedom of the joint. Motor joints may have the property of a control signal which dictates where the parts receive their input signal. Motor joints may also have the property of a joint control system that modifies an input signal prior to using the signal to stipulate a force, position, velocity or acceleration with which to drive the joint.

At processing block 508, processing logic uses the joint type determined at processing block 506 to create a joint between the two parts. The resulting joint defines physical constraints between the two parts. In one embodiment, a joint has a flexibility property and a break threshold property. The flexibility property may specify a spring constant that dictates the flexibility compliance of the joint. The break threshold property may specify a force threshold controlling when the joint should be removed during physical simulation. The break threshold property may specify both a normal and shear threshold. The flexibility and break threshold properties of the joint are defined to cause the joint to approximate the behavior of a real joint in the real world. For example, a glue joint can have high flexibility and a low break threshold, a weld joint can have a low flexibility and a high break threshold, and a snap joint may have a low normal break threshold and a high shear break threshold. Exemplary surface types and corresponding joints will be discussed in more detail below in conjunction with FIG. 10.

Figure 6:
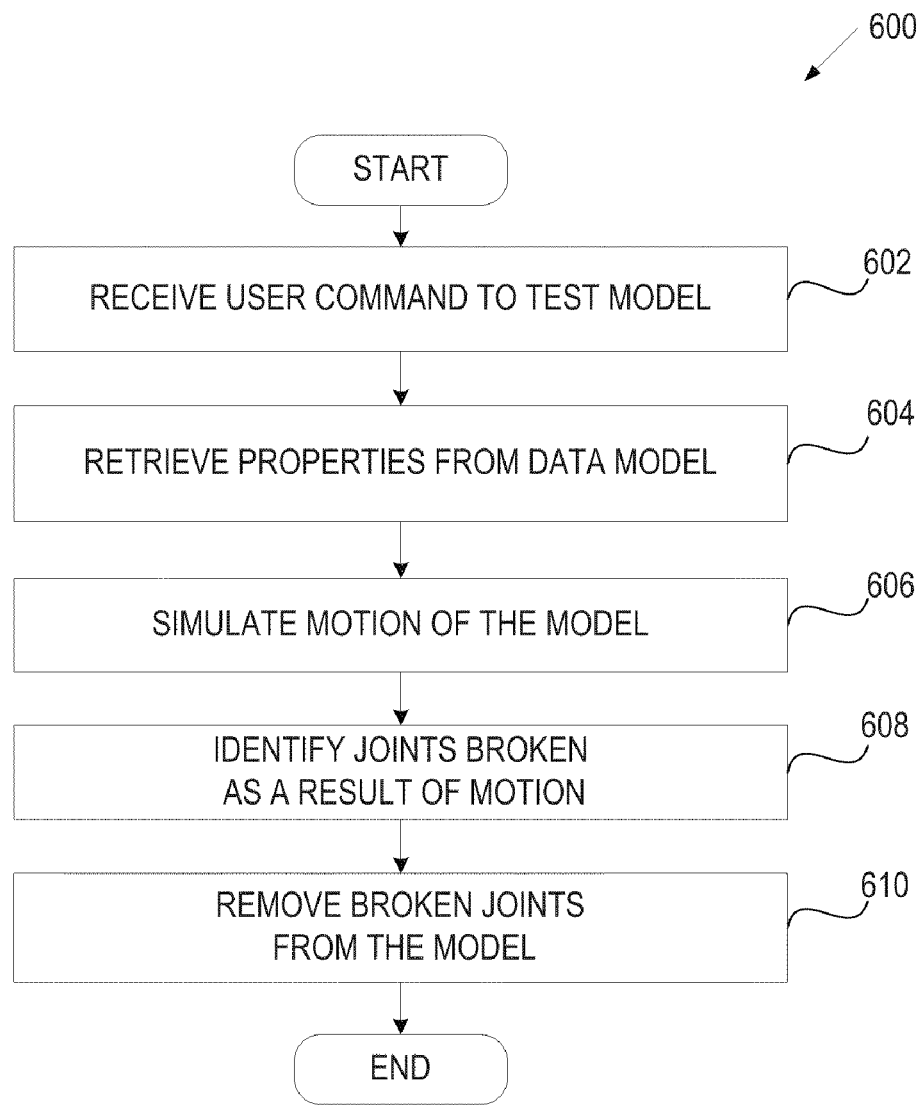
FIG. 6 is a flow diagram of one embodiment of a process 600 for testing a model.

FIG. 6 is a flow diagram of one embodiment of a process 600 for testing a model. The process may be performed by processing logic that may comprise hardware (e.g., dedicated logic, programmable logic, microcode, etc.), software (such as run on a general purpose computer system or a dedicated machine), or a combination of both. In one embodiment, processing logic resides in a physics engine 212 of FIG. 2.

Referring to FIG. 6, process 600 begins with processing logic receiving a user command to test a model (processing block 602). In one embodiment, this user command is received when the user selects a run option in the menu of a build UI.

At processing block 604, processing logic retrieves properties resident in the data model describing the relevant model. In one embodiment, these properties are properties of parts integrated into the model and properties of joints connecting these parts.

At processing block 606, processing logic simulates the motion of the model based on the above properties in response to control signals received via a controller associated with the model. In one embodiment, processing logic computes object position and orientation on a frame-by-frame basis.

At processing block 608, processing logic identifies individual joints that have broken as a result of the simulated motion. Breaking of a joint may be dictated by the joint property and/or physical simulation properties of the relevant parts.

At processing block 610, processing logic removes the broken joints from the model and, in one embodiment, redefines the model based on the remaining joints.

Figure 7:
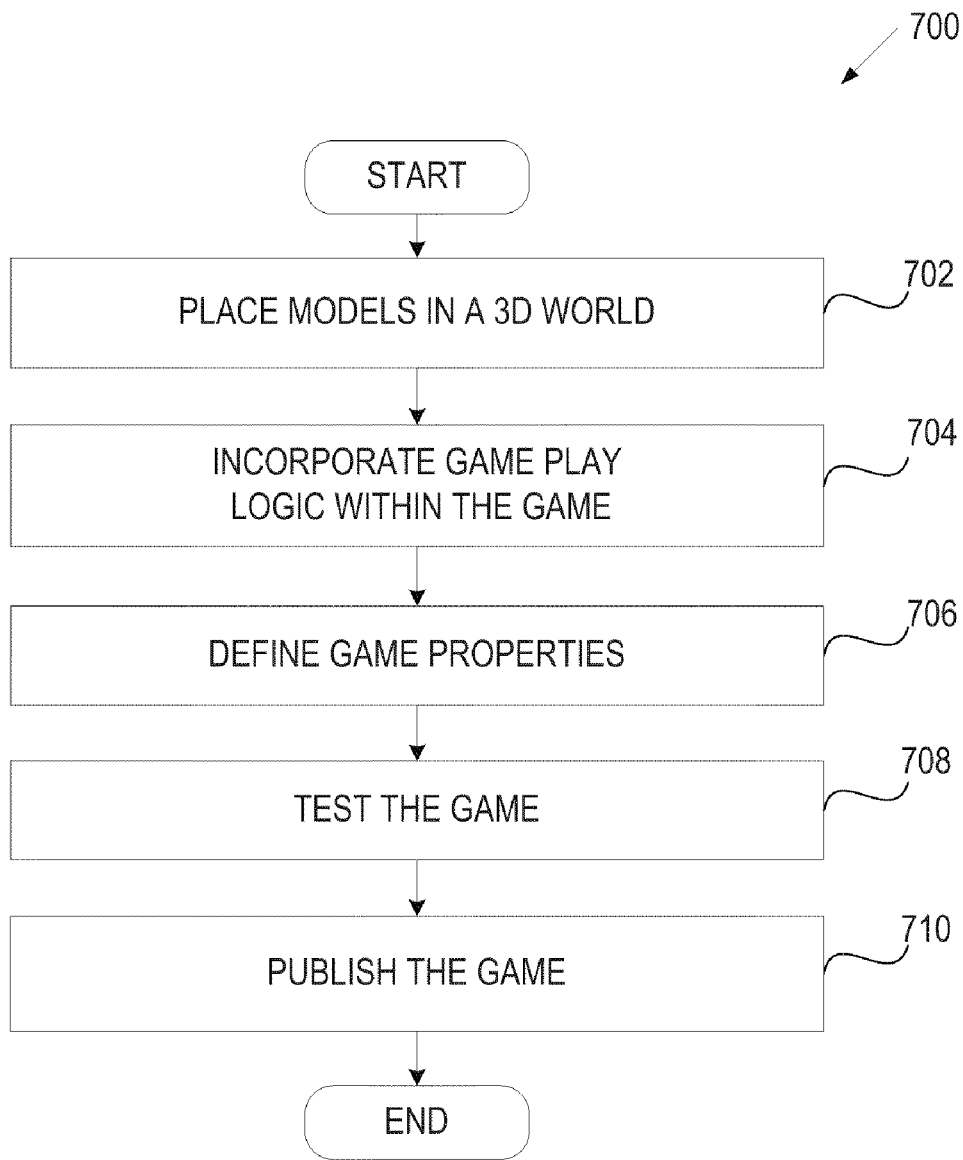
FIG. 7 is a flow diagram of one embodiment of a process for building a game.

FIG. 7 is a flow diagram of one embodiment of a process 700 for building a game. The process may be performed by processing logic that may comprise hardware (e.g., dedicated logic, programmable logic, microcode, etc.), software (such as run on a general purpose computer system or a dedicated machine), or a combination of both. In one embodiment, processing logic resides in a game builder 108 of FIG. 1.

Referring to FIG. 7, process 700 begins with processing logic placing one or more models in a 3D world (processing block 702). The 3D world may be a 3D view of an empty game. The models may include one or more models authored by the user constructing the game. A model authored by the user constructing the game may be stored in memory in the form of a data model. The user may also select for the game models authored by other users. In one embodiment, this selection may be made by choosing a model from a model catalog displayed to the user in response to the user's request to view existing games. In one embodiment, the model catalog contains images of models maintained by the online gaming service 102. The model catalog may be sorted by a model author, model creation date, model popularity and user ranking. In one embodiment, when the user clicks on a model image in the model catalog, the corresponding model is requested from the online gaming service 102. Upon receiving the game file from the online gaming service 102, processing logic loads it into the data model and displays its 3D image in the 3D world.

The models may be placed in the 3D world to create a game of a specific type. These types may include, for example, puzzle games, multiplayer games, combination games, controller games and real-time manipulation games. A puzzle game does not include controllable items, and is created when the user places items in the 3D world. A multiplayer game is intended to be played by several users, and is created when more than one controllable item is placed within a game, and users in different locations access the same game. A combination game is a game that requires the user to both manipulate or place parts and models (in an edit phase), followed by a runtime phase where the user controls models in the game. A controller game is a game without any edit phase, the user simply controls items in a runtime phase. A real-time manipulation game is a game that requires a user to manipulate place parts and models during the runtime phase.

In one embodiment, a game is characterized as a collection of items. A game can be represented in the form of a data model, or in binary form as a game file. In one embodiment, a game maintains two counters, the timer counter and the score counter, and a current state such as an edit state or a run state. During the edit state, physical simulation is not used and parts maintain their positions. During the run state, physical simulation is used to move parts according to their physical properties using the physics engine.

In one embodiment, a game has a set of properties including, for example, descriptive properties and gameplay properties. Descriptive properties may specify the game's name, keywords describing the game, etc. Gameplay properties may indicate whether a high score should be thought of as better than a lower score for the purposes of ranking, and whether the run state should be immediately used following the opening of a game file. Gameplay properties may also contain the initial timer value property that specifies the starting value for the timer counter during the run state, the property of initial score that specifies the starting value for the score counter during the run state, and the property of timer up action that defines the action to take when the timer counter goes to the value of 0. Such an action may be, for example, a win action, a lose action, a draw action, and a pause action. Gameplay properties may further contain the timer affects score property that defines how the timer counter should affect the score counter during the run state (e.g., increase the score, decrease the score or do not change the score).

At processing block 704, processing logic incorporates gameplay logic within the game. In one embodiment, the gameplay logic is incorporated by defining gameplay properties of the game and/or gameplay properties of the models included in the game. The gameplay properties may be defined based on user input or using default gameplay properties.

At processing block 706, processing logic defines other properties of the game such as the name of the game, the keywords describing the game, etc., and saves the game in the form of the data model.

At processing block 708, processing logic tests the game by simulating the motion of the models and parts within the game. The simulation may be performed in the manner discussed above. In one embodiment, the simulation is performed upon receiving a user request to test the game. Alternatively, the simulation may be performed automatically once the game is created.

At processing block 710, processing logic receives a user request to publish the game and converts the memory resident game within the data model to a binary stream, which is then transmitted to the online gaming server 102.

Figure 8:
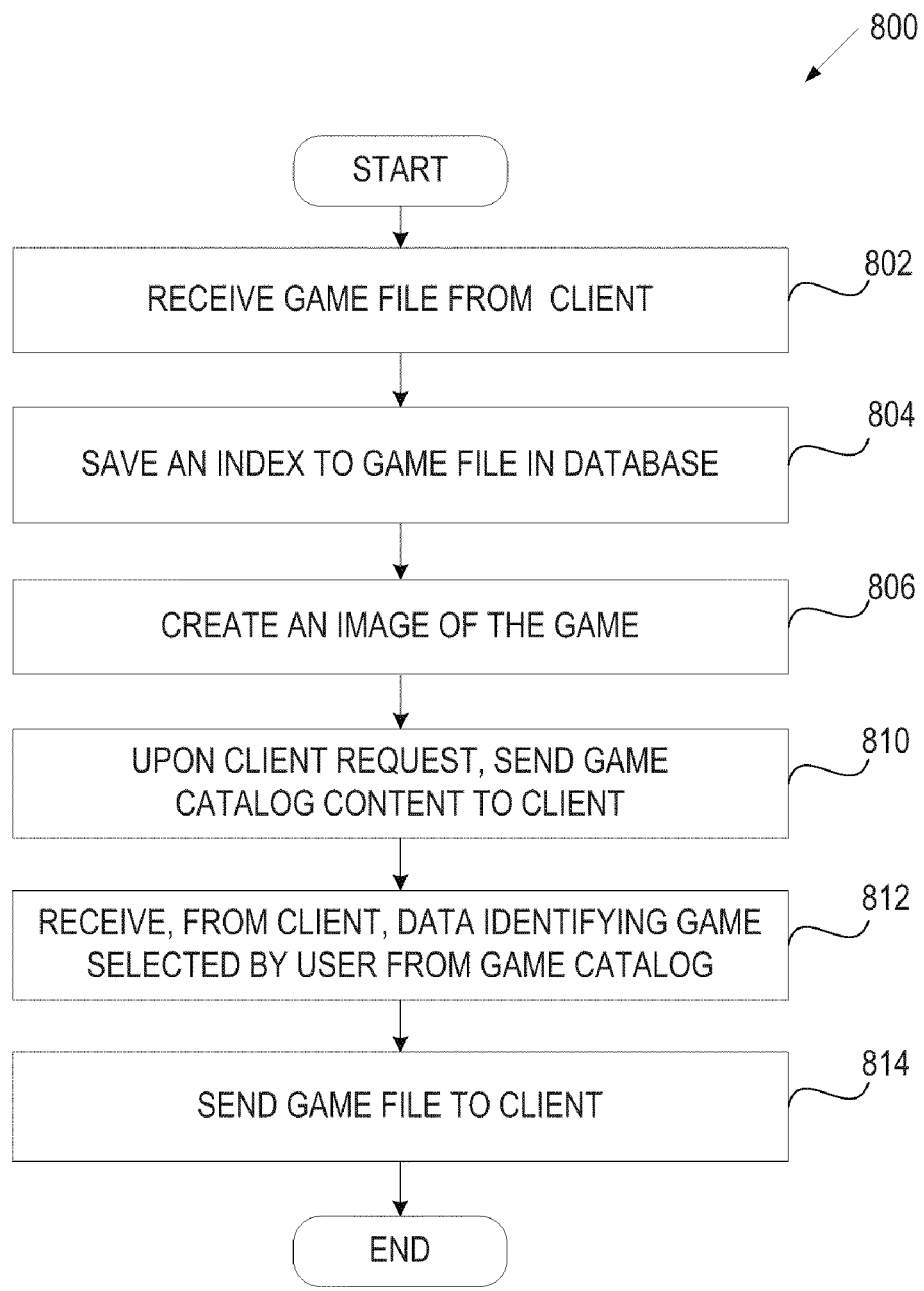
FIG. 8 is a flow diagram of one embodiment of a process for facilitating sharing of games among different users.

FIG. 8 is a flow diagram of one embodiment of a process 800 for facilitating sharing of games among different users. The process may be performed by processing logic that may comprise hardware (e.g., dedicated logic, programmable logic, microcode, etc.), software (such as run on a general purpose computer system or a dedicated machine), or a combination of both. In one embodiment, processing logic resides in an online gaming service 102 of FIG. 1.

Referring to FIG. 8, process 800 begins with processing logic receiving a game file from a client (processing block 802).

Next, processing logic saves an index (e.g., the game hash) for the game file in a database (processing block 804), creates a thumbnail image of the game (processing block 806), stores the game file on the file server 318, and stores the image of the game on the image server 310. In one embodiment, processing logic also caches the game image file for subsequent requests.

Further, upon receiving a request to view existing games from one of multiple clients, processing logic creates a page (e.g., HTML document) containing a game catalog with images of games stored by the online gamine service 102 and sends this page to the requestor (processing block 810). In on embodiment, the game catalog may also contain information identifying the author of the game, the game creation date, the popularity of the game, and the author ranking.

Afterwards, processing logic receives, from the client, data identifying a game selected by a user from the game catalog (processing block 812), queries the database to find the index for this game, and sends a corresponding game file to the client (processing block 814).

Figure 9:
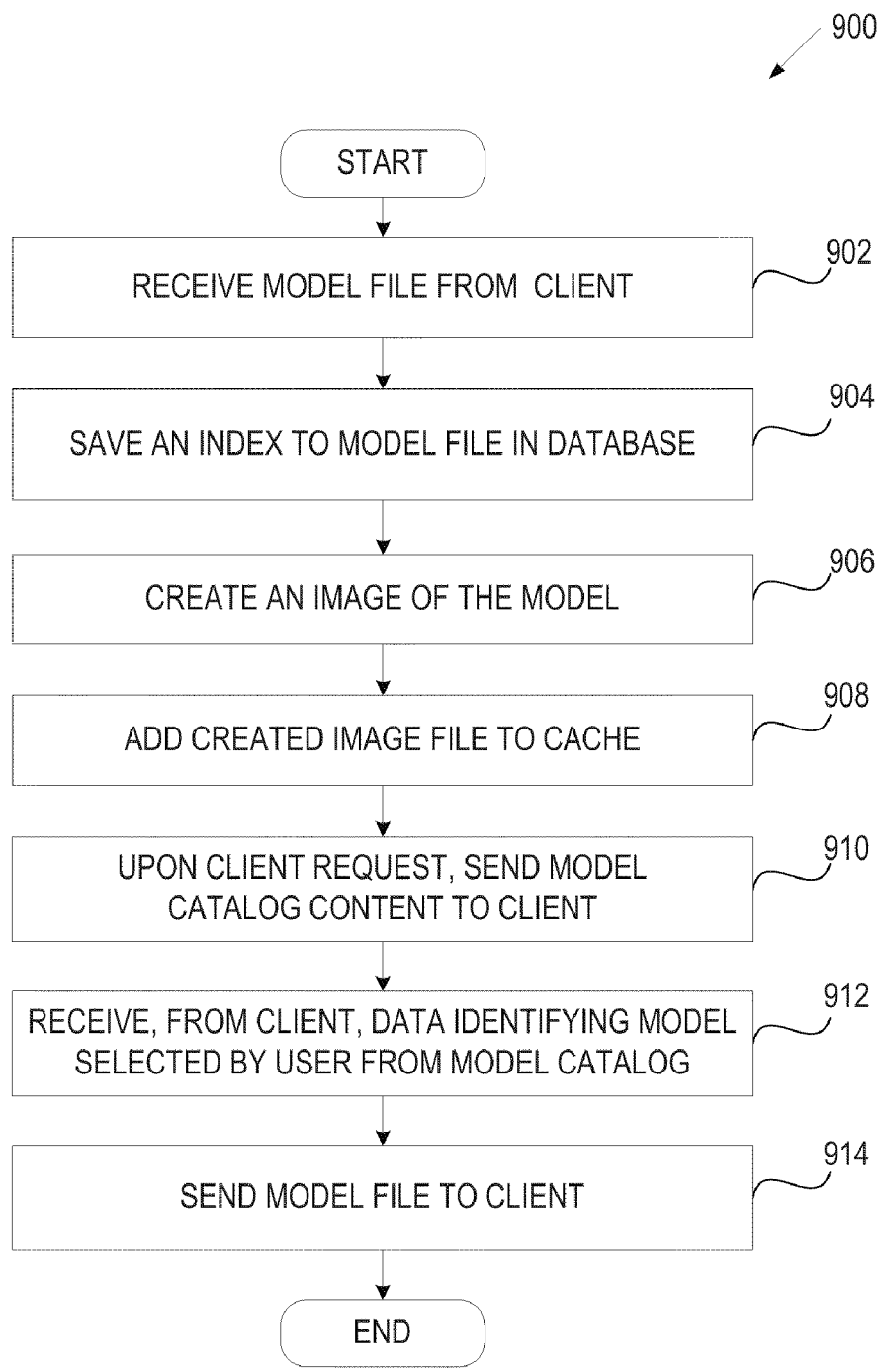
FIG. 9 is a flow diagram of one embodiment of a process for facilitating sharing of models among different users.

FIG. 9 is a flow diagram of one embodiment of a process 900 for facilitating sharing of models among different users. The process may be performed by processing logic that may comprise hardware (e.g., dedicated logic, programmable logic, microcode, etc.), software (such as run on a general purpose computer system or a dedicated machine), or a combination of both. In one embodiment, processing logic resides in an online gaming service 102 of FIG. 1.

Referring to FIG. 9, process 900 begins with processing logic receiving a model file from a client (processing block 902).

Next, processing logic saves an index (e.g., the model hash) for the model file in a database (processing block 904), creates an image of the model (processing block 906), stores the model file on the file server 318, and stores the image of the model on the image server 310. In one embodiment, processing logic also caches the model image file for subsequent requests (processing block 908).

Further, upon receiving a request to view existing models from one of multiple clients, processing logic creates a page (e.g., HTML document) containing a model catalog with images of models stored by the online gamine service 102 and sends this page to the requestor (processing block 910). In on embodiment, the model catalog may also contain information identifying the author of the model, the model creation date, the popularity of the model, and the author ranking.

Afterwards, processing logic receives, from the client, data identifying a model selected by a user from the model catalog (processing block 912), queries the database to find the index for this model, and sends a corresponding model file to the client (processing block 914).

Figure 10:
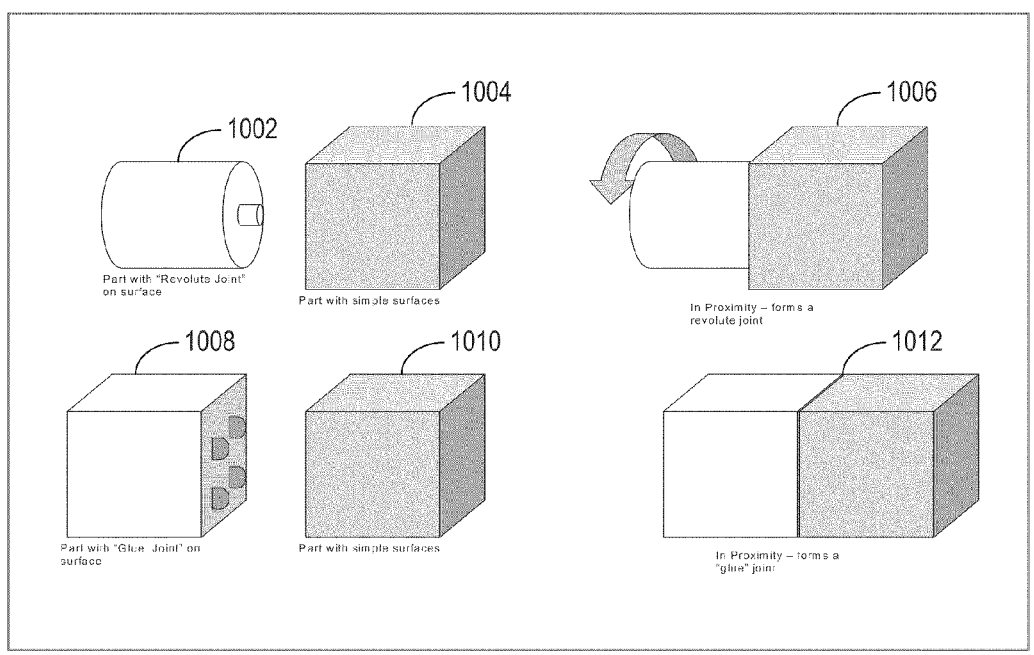
FIG. 10 illustrates exemplary parts with different surface types and resulting joints formed for these surface types according to one embodiment of the present invention.

FIG. 10 illustrates exemplary parts with different surface types and resulting joints formed for these surface types according to one embodiment of the present invention. Part 1002 having a revolute joint on the surface is joined with part 1004 that has simple surfaces, creating a revolute joint 1006. Part 1008 having a glue joint is joined with part 101 that has simple surfaces, forming a glue joint 1012.

FIGS. 12-15 show exemplary representations of various user interfaces facilitating construction of models and games according to some embodiments of the present invention.

Figure 12A:
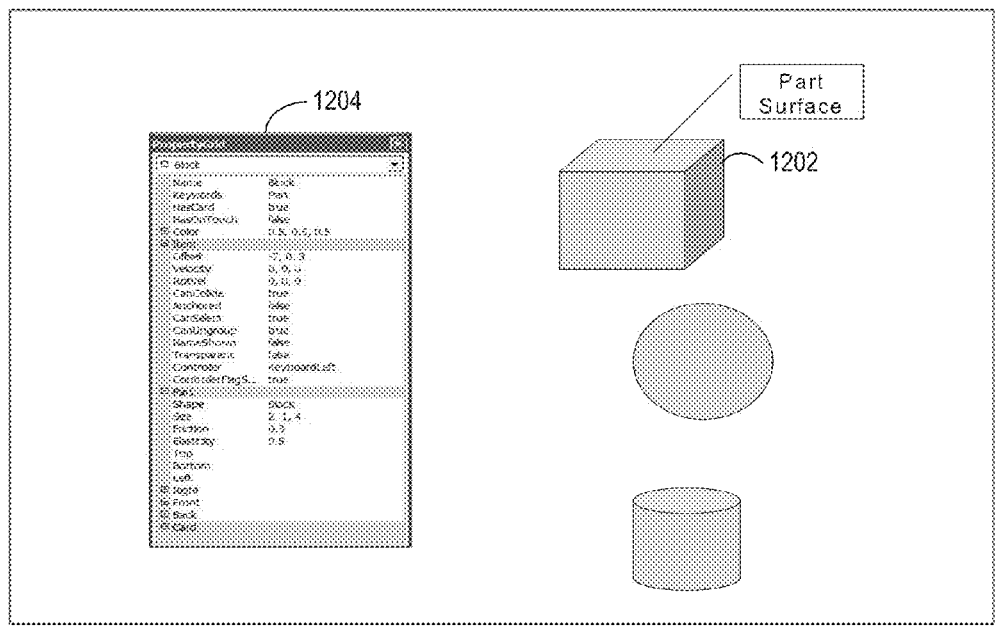
FIGS. 12-15 show exemplary representations of various user interfaces facilitating construction and selection of models and games according to some embodiments of the present invention.

FIG. 12A illustrates a popup window displaying properties of a part. In particular, a popup window 1204 displays properties of a block 1202.

Figure 12B:
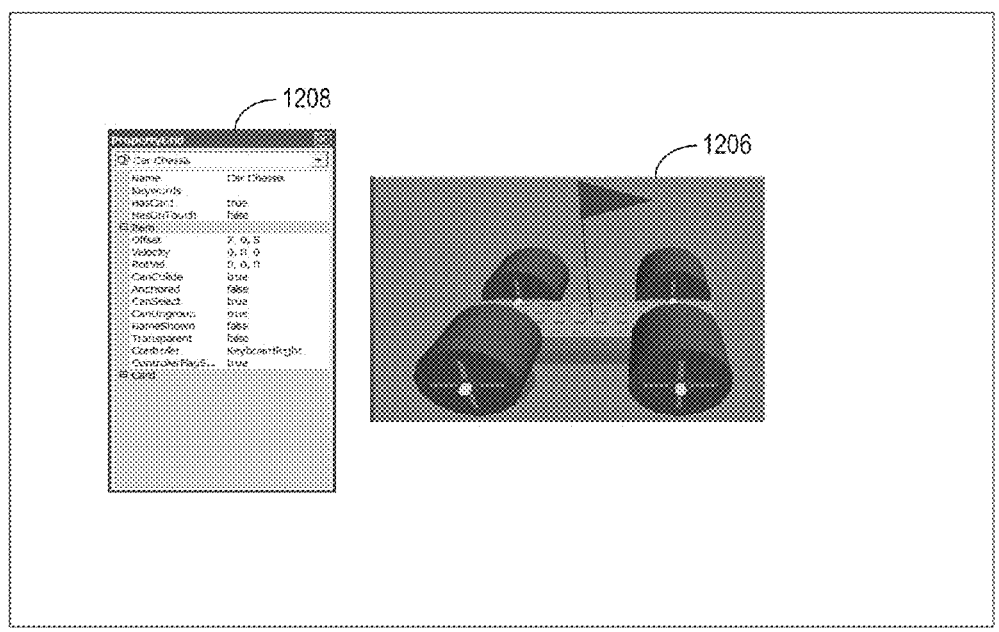

FIG. 12B illustrates a popup window displaying properties of a model. In particular, a popup window 1208 displays properties of a car chassis 1206.

FIG. 12C illustrates a popup window 1210 displaying properties of a part, including its on touch properties 1212.

FIG. 12D illustrates a popup window 1214 displaying properties of a part, including a menu 1216 specifying various control signals.

FIG. 13A illustrates a popup window 1302 displaying properties of a game, including its gameplay properties 1304.

Figure 13B:
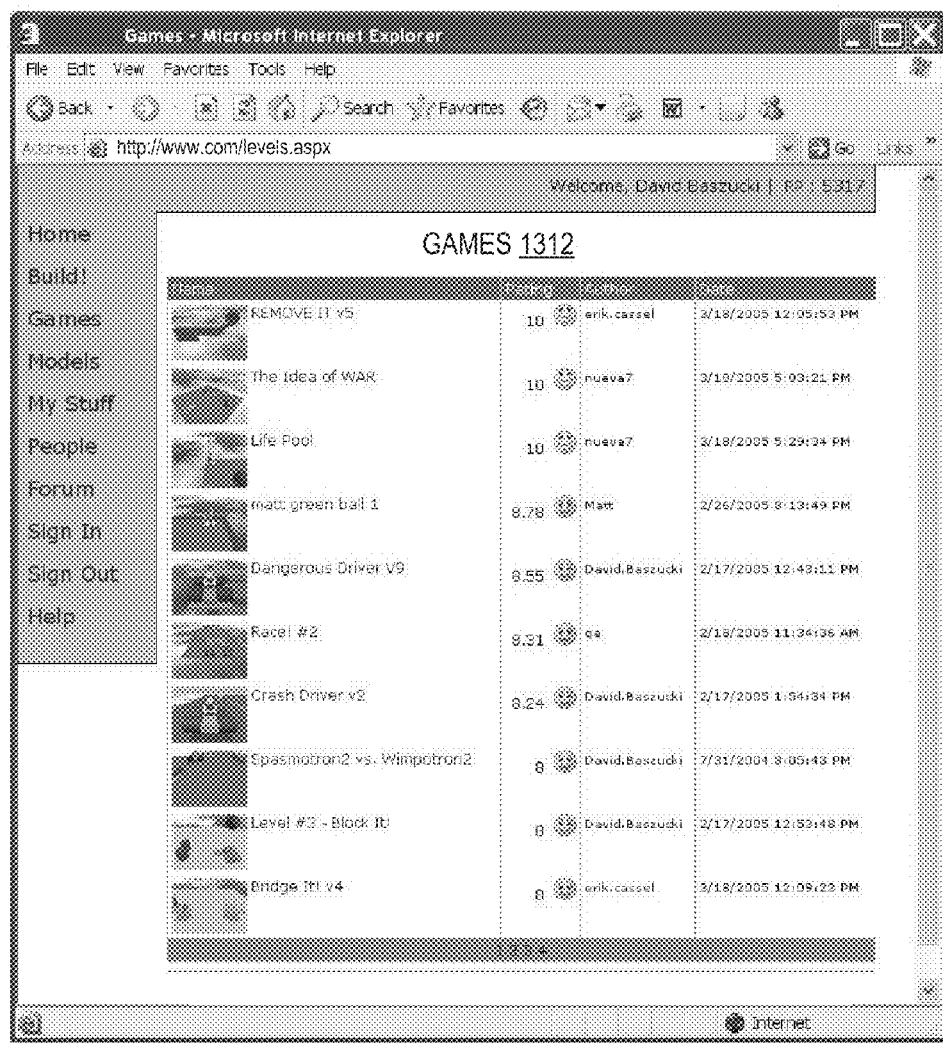

FIG. 13B shows a window 1310 displaying a game catalog 1312.

Figure 13C:
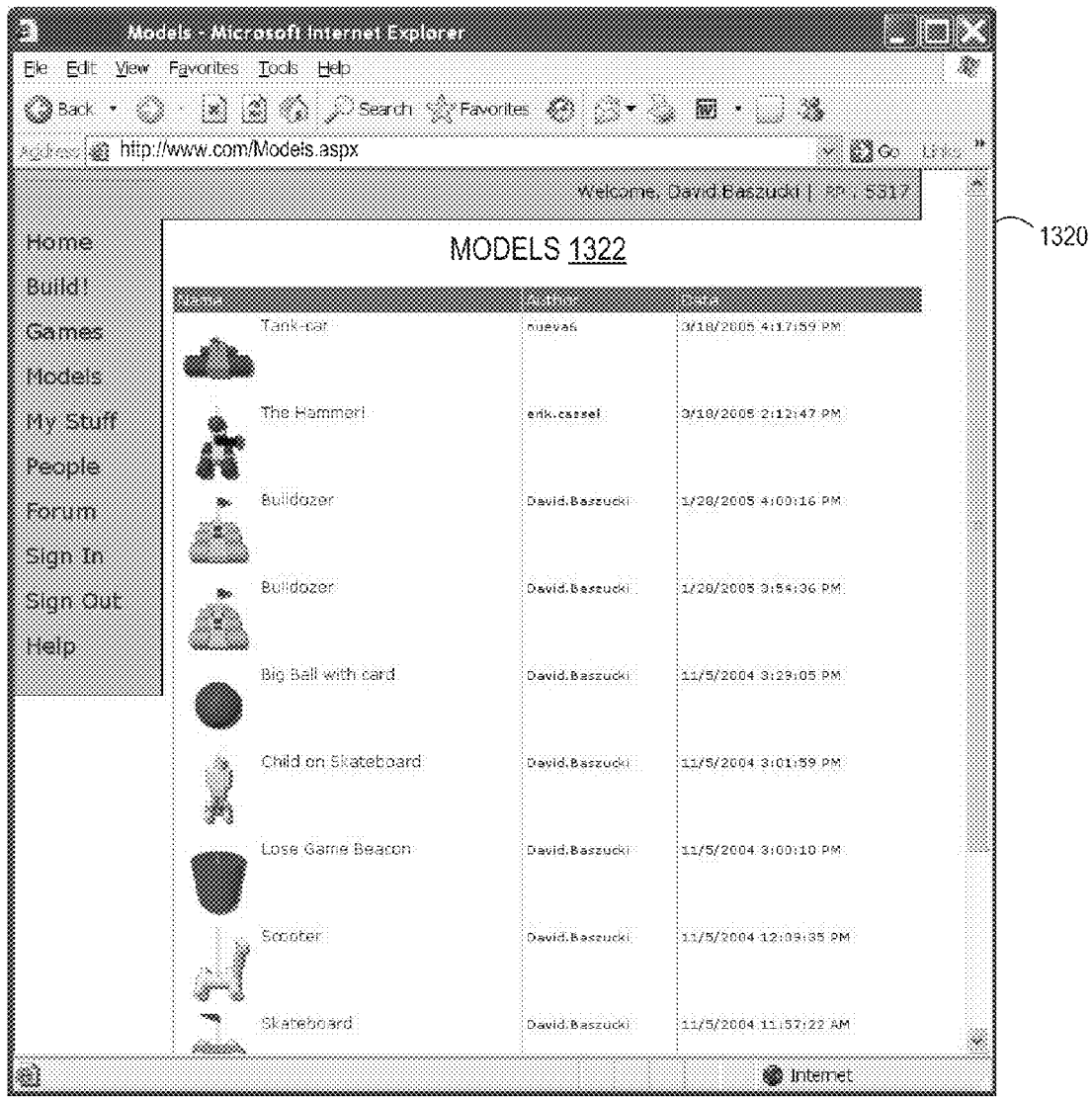

FIG. 13C shows a window 1320 displaying a game catalog 1322.

Figure 14:
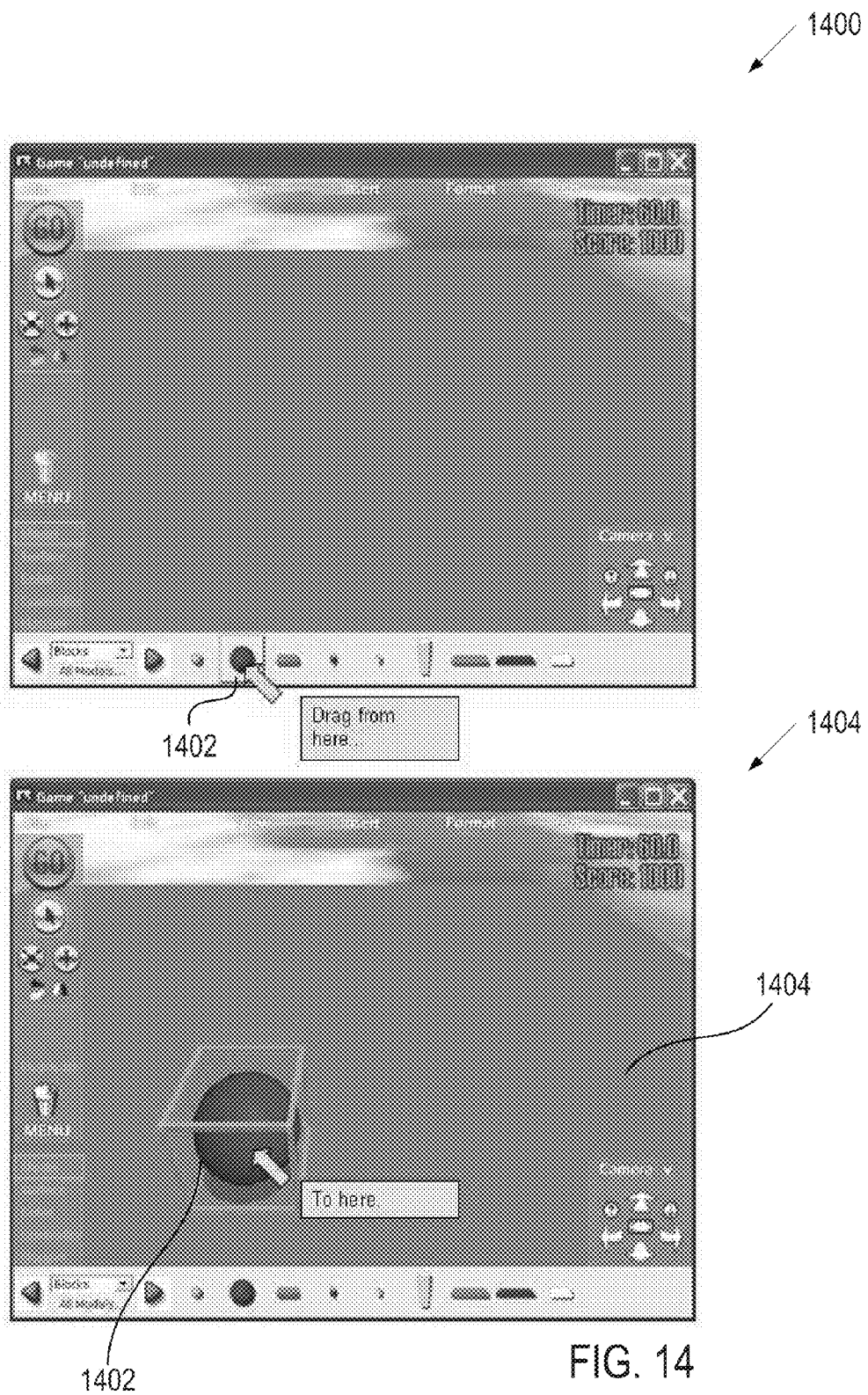

FIG. 14 illustrates a build UI 1400 facilitating a user selection of a part 1402. The selected part 1402 is placed in a 3D world 1404.

Figure 15A:
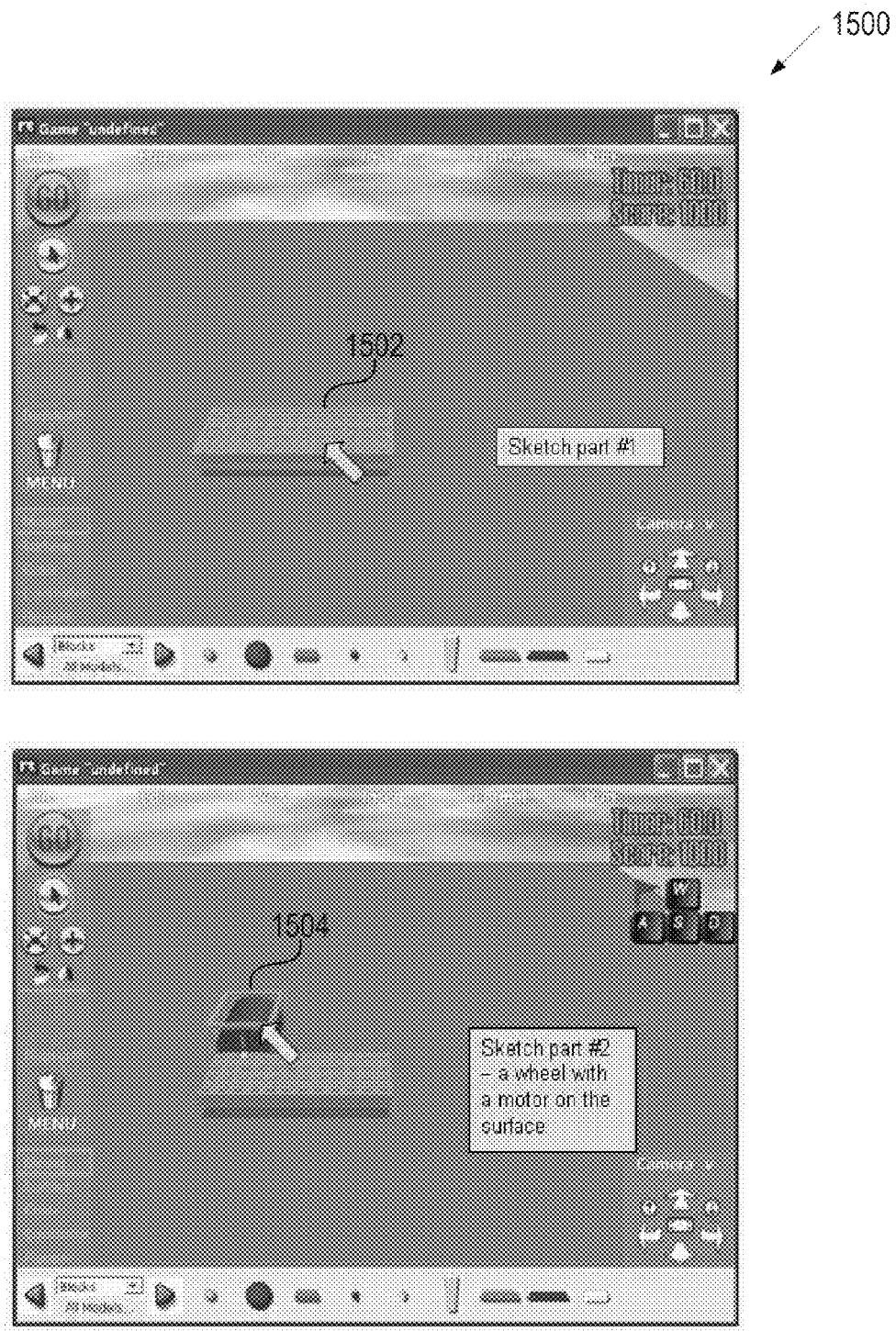
Figure 15B:
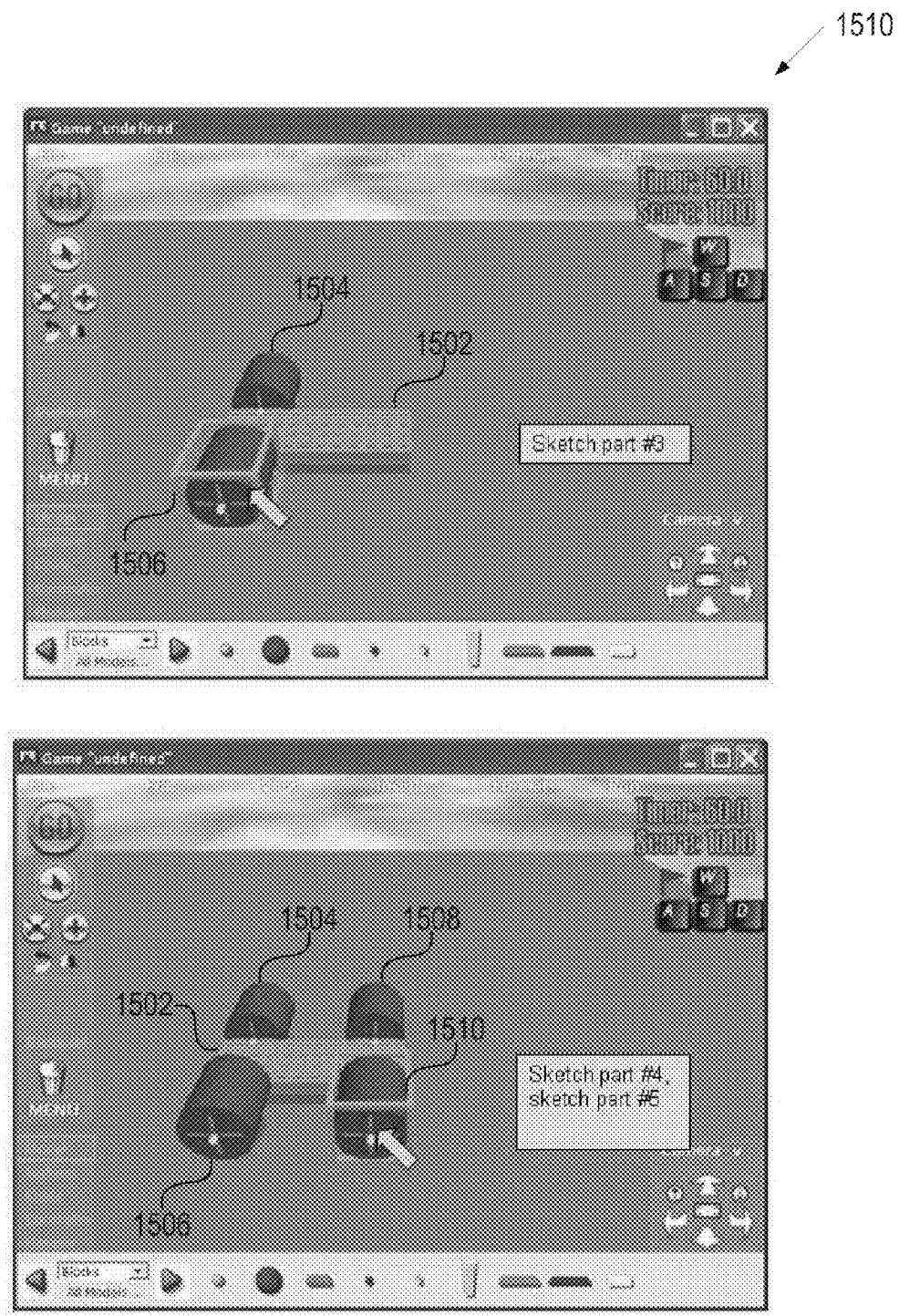

FIGS. 15A-15B illustrate a build UI 1500 facilitating a user selection of parts 1502 through 1512 for a model. As shown, the user selects five parts 1502 through 1512 that are placed in a 3D world.

FIG. 15C illustrates a build UI 1520 that allows a user to select all the parts and to request grouping of the parts (by selecting a group option 1522 in the menu). In response, the selected parts are grouped into a model 1524.

Figure 15D:
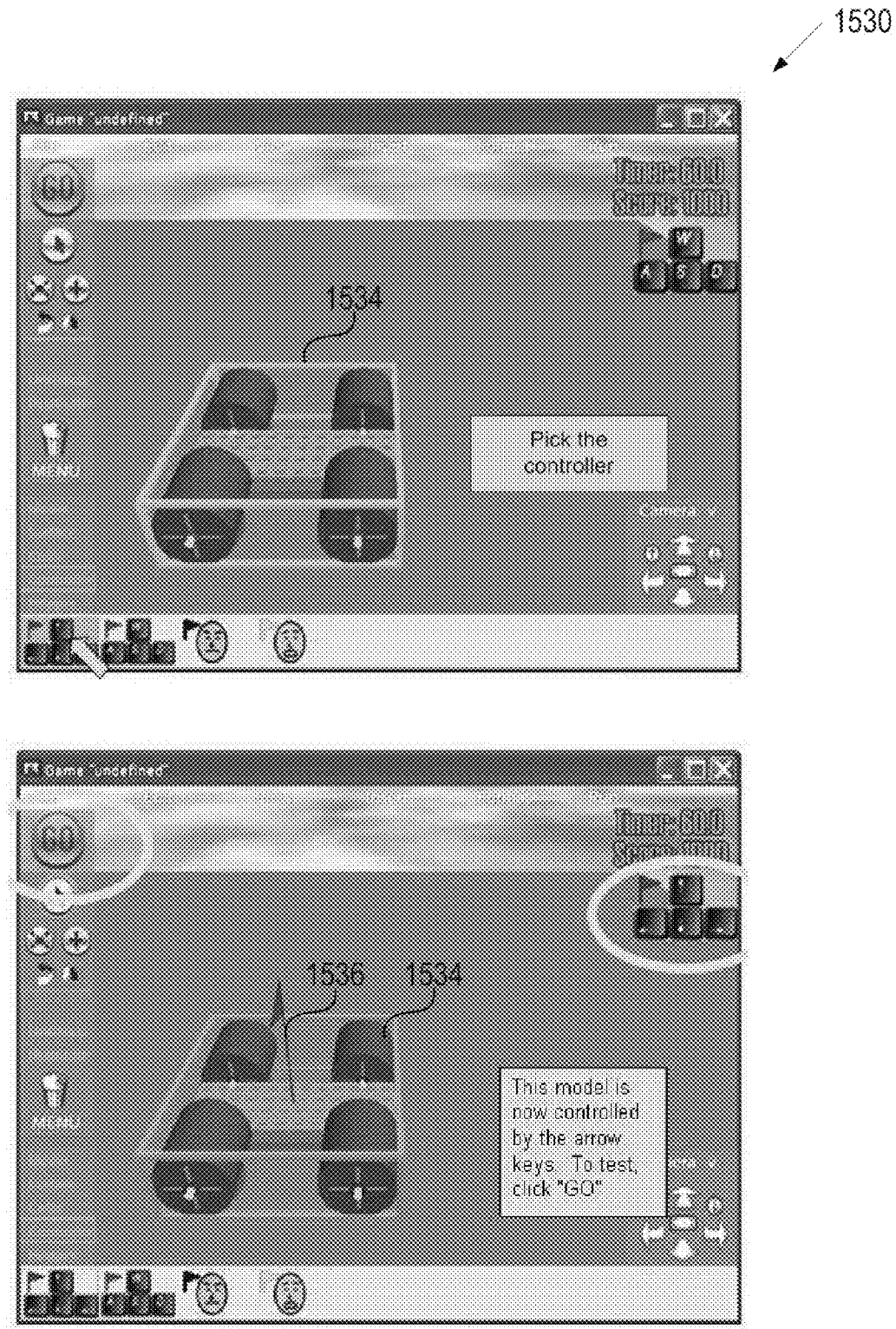

FIG. 15D illustrates a build UI 1530 facilitating a user selection of a controller for a model 1534. The controller is displayed as a flag 1536 attached to the model 1534.

Figure 15E:
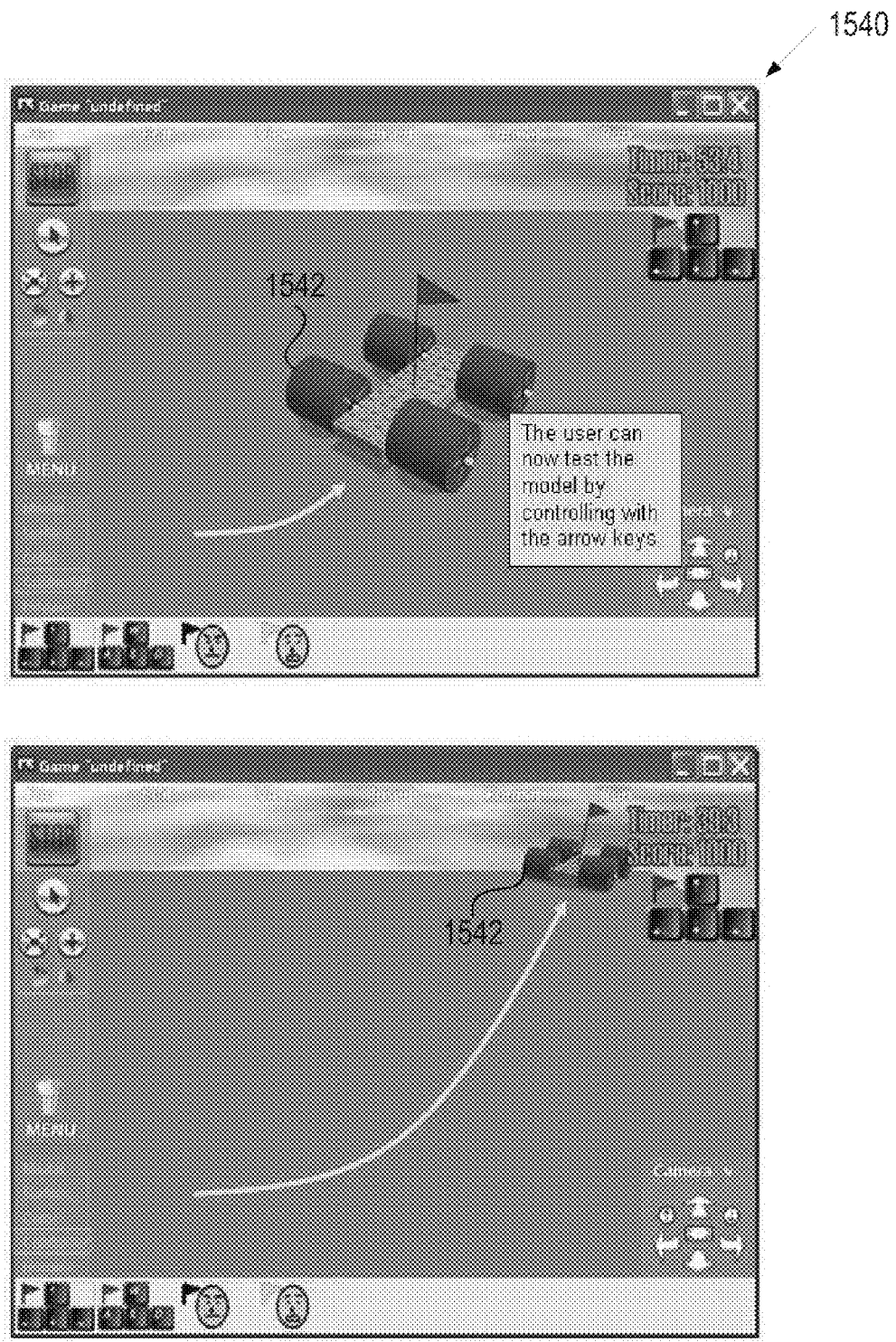

FIG. 15E illustrates a build UI 1540 facilitating the testing of a model 1542. The controller is used to control the motion of the model 1542 during physical simulation.

Figure 16:
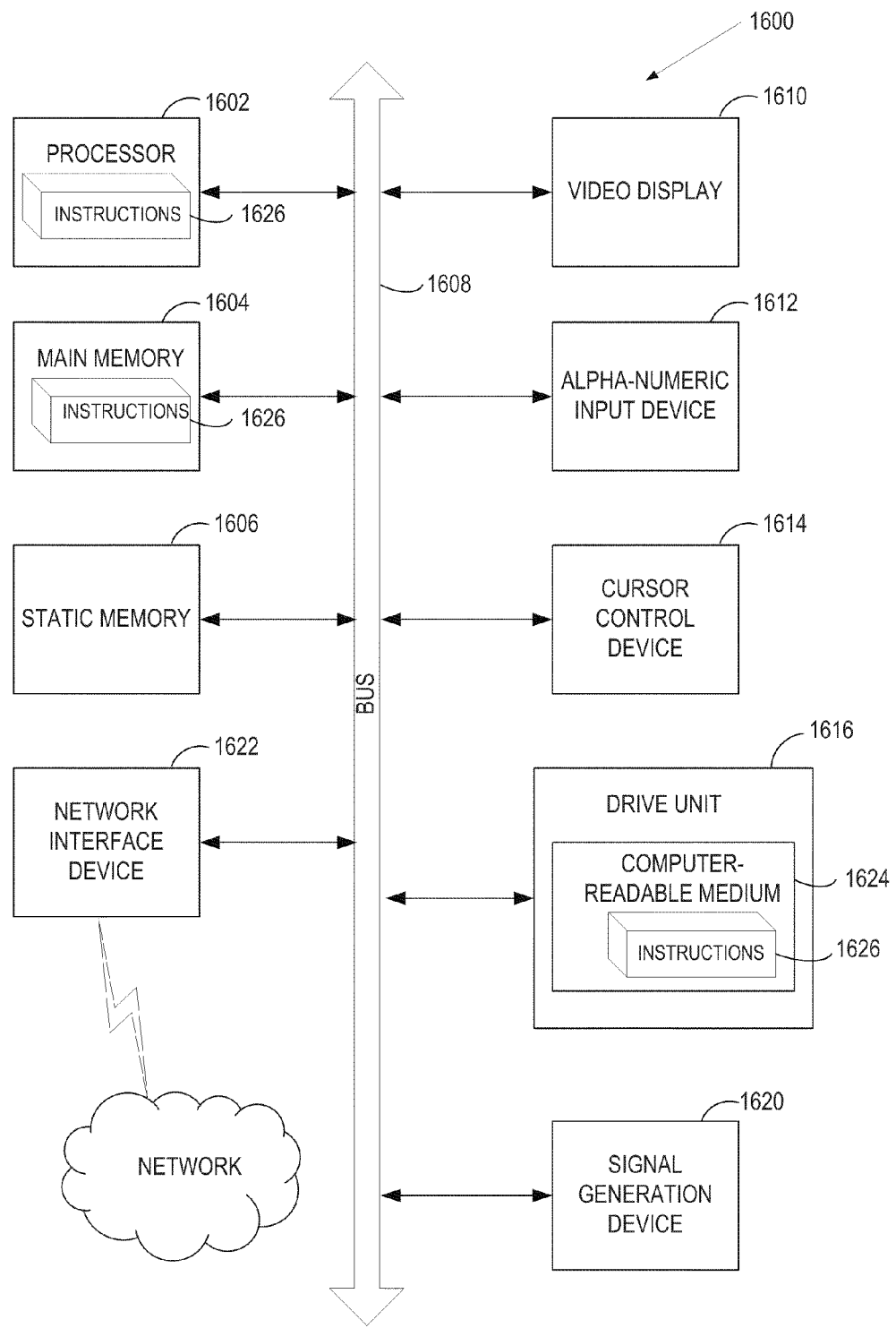
FIG. 16 is a block diagram of one embodiment of a computer system.

FIG. 16 shows a diagrammatic representation of machine in the exemplary form of a computer system 1600 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1600 includes a processor 1602, a main memory 1604 and a static memory 1606, which communicate with each other via a bus 1608. The computer system 1600 may further include a video display unit 1610 (e.g., a liquid crystal display (LCD) or a cathode ray tube (CRT)). The computer system 1600 also includes an alpha-numeric input device 1612 (e.g. a keyboard), a cursor control device 1614 (e.g. a mouse), a disk drive unit 1616, a signal generation device 1620 (e.g., a speaker) and a network interface device 1622.

The disk drive unit 1616 includes a computer-readable medium 1624 on which is stored a set of instructions (i.e., software) 1626 embodying any one, or all, of the methodologies described above. The software 1626 is also shown to reside, completely or at least partially, within the main memory 1604 and/or within the processor 1602. The software 1626 may further be transmitted or received via the network interface device 1622. For the purposes of this specification, the term "computer-readable medium" shall be taken to include any medium that is capable of storing or encoding a sequence of instructions for execution by the machine and that cause the machine to perform any one of the methodologies of the present invention. The term "computer-readable medium" shall accordingly be taken to included, but not be limited to, solid-state memories, optical and magnetic disks, and carrier wave signals.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A computerized method comprising:
providing, by a computer system, a user interface for creating a game, the user interface facilitating user selection of parts for the game;
placing, by the computer system, a set of parts selected by a user in a three-dimensional (3D) world;
automatically detecting, without user interaction, by the computer system, adjacent parts within the set based on proximity of surfaces of the parts in the 3D world while parts are being moved during editing operations of the user;

upon detecting the adjacent parts, automatically determining, without user interaction, joint types for the adjacent parts;

automatically creating, without user interaction, by the computer system, one or more joints of the determined joint types between the adjacent parts, wherein at least some of the adjacent parts are primitive geometric shapes selected by the user for joining with other parts in the set, the primitive geometric shapes including at least one of a block, a wedge, a cylinder and a sphere;

forming one or more models for the game from the set of parts that comprises parts automatically joined, without user interaction, using the one or more joints; and physically simulating, by a rigid body physics engine, motion of joined parts having one or more joints in the game and motion of the one or more models in the game.

2. The method of claim 1, further comprising:
detecting, by the physics engine, a first collision between the joined parts having one or more joints in the 3D world during physical simulation of the motion of the joined parts having one or more joints and the one or more models; and
simulating, based on the one or more properties, a behavior of the joined parts having one or more joints that results from the first collision.

3. The method of claim 2, further comprising:
allowing a user to modify one or more properties of joined parts having one or more joints, the joined parts selected by the user in the 3D world; and
simulating, based on the modified properties, a modified behavior of the joined parts having one or more joints that results from a second collision.

4. The method of claim 1 further comprising:
simulating a motion of the one or more models;
identifying connections broken as a result of the motion; and
removing the broken connections from the one or more models.

5. The method of claim 1 further comprising:
incorporating gameplay logic into the one or more models.

6. The method of claim 1 further comprising:
sending a game file for the game to the server via the network for use by the plurality of users.

7. The method of claim 1 further comprising:
receiving a request of the user for an existing model created by a different user;
requesting a model file of the existing model from the server;
presenting the existing model to the user; and
modifying the existing model based on input of the user.

8. The method of claim 1 further comprising:
receiving a request of the user for an existing game created by a different user;
requesting a game file for the existing game from the server;
presenting the existing game to the user; and
allowing the user to play the existing game.

9. The method of claim 1 wherein one of the one or more models is created in response to a user request to group specific parts.

10. The method of claim 1 wherein the game is associated with a plurality of properties selected from the group consisting of one or more description properties and one or more gameplay properties.

11. The method of claim 1 wherein each part in the set of parts and each of the one or more models is associated with a plurality of properties selected from the group consisting of physical properties, visual properties, descriptive properties, editing properties, physical simulation properties, and gameplay properties.

12. The method of claim 1 wherein each of the joints has one or more properties selected from the group consisting of a flexibility property and a break threshold property.

13. The method of claim 1, wherein the physically simulating the motion of joined parts and motion of the one or more models uses one or more properties, wherein the one or more properties specify one or more of an event to occur when joined parts having one or more joints collide during simulation and whether joined parts having one or more joints are intended to collide during simulation.

14. The method of claim 13, wherein the event to occur when joined parts collide is a result of a collision between a moving model and another moving item.

15. The method of claim 1, wherein the one or more properties modifiable by the user include one or more physical properties specifying one or more of mass, elasticity, and friction.

16. The method of claim 1, wherein:
the joint types comprise one or more of a no-joint type, a rigid joint, a revolute joint, and a motor joint; and
the one or more joints comprise one or more of a snap rigid joint, a glue joint, a bold rigid joint, and a weld rigid joint.

17. The method of claim 1, wherein the automatically determining joint types for the adjacent parts is based on surface types of the adjacent parts.

18. A system comprising:
a memory; and
a processing system, coupled to the memory, the processing system causing:
a user interface presenter to provide a user interface for creating a game, the user interface facilitating user selection of parts for the game;
an editing engine to place a set of parts selected by a user in a three-dimensional (3D) world;
a joint engine to automatically detect, without user interaction, adjacent parts within the set based on proximity of surfaces of the parts in the 3D world while parts are being moved during editing operations of the user and, upon detecting the adjacent parts, to automatically determine, without user interaction, joint types for the adjacent parts and to automatically create, without user interaction, one or more joints of the determined joint types between the adjacent parts, wherein at least some of the adjacent parts are primitive geometric shapes selected by the user for joining with other parts in the set, the primitive geometric shapes including at least one of a block, a wedge, a cylinder and a sphere, and to form one or more models for the game from the set of parts that comprises parts automatically joined, without user interaction, using the one or more joints; and
a physics engine to physically simulate motion of joined parts having one or more joints in the game and motion of the one or more models in the game.

19. A computer readable medium that provides instructions, which when executed on a processing system, cause said processing system to perform a method comprising:
providing, by a computer system, a user interface for creating a game, the user interface facilitating user selection of parts for the game;

placing, by the computer system, a set of parts selected by a user in a three-dimensional (3D) world;

automatically detecting, without user interaction, by the computer system, adjacent parts within the set based on proximity of surfaces of the parts in the 3D world while parts are being moved during editing operations of the user;

upon detecting the adjacent parts, automatically determining, without user interaction, joint types for the adjacent parts;

automatically creating, without user interaction, by the computer system, one or more joints of the determined joint types between the adjacent parts, wherein at least some of the adjacent parts are primitive geometric shapes selected by the user for joining with other parts in the set, the primitive geometric shapes including at least one of a block, a wedge, a cylinder and a sphere;

forming one or more models for the game from the set of parts that comprises parts automatically joined, without user interaction, using the one or more joints; and physically simulating, by a rigid body physics engine, motion of joined parts having one or more joints in the game and motion of the one or more models in the game.

* * * * *